United States Patent
Burr et al.

(10) Patent No.: US 9,880,987 B2
(45) Date of Patent: *Jan. 30, 2018

(54) SYSTEM AND METHOD FOR PARAMETERIZING DOCUMENTS FOR AUTOMATIC WORKFLOW GENERATION

(71) Applicant: Palantir Technologies, Inc., Palo Alto, CA (US)

(72) Inventors: Brandon Burr, Palo Alto, CA (US); Akshay Pundle, Palo Alto, CA (US); Kevin Simler, Fremont, CA (US); Nick Miyake, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 14/715,834

(22) Filed: May 19, 2015

(65) Prior Publication Data

US 2015/0254220 A1    Sep. 10, 2015

Related U.S. Application Data

(63) Continuation of application No. 14/265,637, filed on Apr. 30, 2014, now Pat. No. 9,058,315, which is a
(Continued)

(51) Int. Cl.
*G06F 17/00* (2006.01)
*G06F 17/24* (2006.01)
(Continued)

(52) U.S. Cl.
CPC ............. *G06F 17/24* (2013.01); *G06Q 10/10* (2013.01); *G06Q 40/02* (2013.01); *G06F 17/30327* (2013.01)

(58) Field of Classification Search
CPC ......... G06F 17/30327; G06F 17/30961; G06F 11/3672
See application file for complete search history.

(56) References Cited

U.S. PATENT DOCUMENTS

| 5,109,399 A | 4/1992 | Thompson |
| 5,241,625 A | 8/1993 | Epard et al. |
(Continued)

FOREIGN PATENT DOCUMENTS

| CN | 102546446 | 7/2012 |
| CN | 103167093 | 6/2013 |
(Continued)

OTHER PUBLICATIONS

U.S. Appl. No. 14/265,637, filed Apr. 30, 2014, Interview Summary, dated Nov. 18, 2014.
(Continued)

*Primary Examiner* — Andrew McIntosh
(74) *Attorney, Agent, or Firm* — Hickman Palermo Becker Bingham LLP

(57) ABSTRACT

One embodiment of the present invention sets forth a method for generating a new workflow for an application. The method includes generating a parameter tree related to a current workflow, wherein the parameter tree includes a different node corresponding to each parameter included in one or more documents associated with the current workflow, modifying a value associated with a first node included in the parameter tree based on an input, wherein the first node corresponds to a first parameter included in a first document associated with the current workflow, evaluating a second document associated with the current workflow based on the modified value associated with the first node, and generating the new workflow based on the evaluated second document.

18 Claims, 7 Drawing Sheets

Related U.S. Application Data continuation of application No. 13/218,238, filed on Aug. 25, 2011, now Pat. No. 8,732,574.

(51) Int. Cl.
  *G06Q 10/10*   (2012.01)
  *G06Q 40/02*   (2012.01)
  *G06F 17/30*   (2006.01)

(56) References Cited

U.S. PATENT DOCUMENTS

| | | |
|---|---|---|
| 5,329,108 A | 7/1994 | Lamoure |
| 5,412,769 A | 5/1995 | Maruoka et al. |
| 5,414,838 A | 5/1995 | Kolton et al. |
| 5,418,950 A | 5/1995 | Li et al. |
| 5,428,737 A | 6/1995 | Li et al. |
| 5,428,776 A | 6/1995 | Rothfield |
| 5,444,819 A | 8/1995 | Negishi |
| 5,454,104 A | 9/1995 | Steidlmayer et al. |
| 5,542,089 A | 7/1996 | Lindsay et al. |
| 5,568,390 A | 10/1996 | Hirota et al. |
| 5,608,899 A | 3/1997 | Li et al. |
| 5,613,105 A | 3/1997 | Xbikowski et al. |
| 5,632,009 A | 5/1997 | Rao et al. |
| 5,670,987 A | 9/1997 | Doi et al. |
| 5,701,456 A | 12/1997 | Jacopi et al. |
| 5,724,575 A | 3/1998 | Hoover et al. |
| 5,781,704 A | 7/1998 | Rossmo |
| 5,794,228 A | 8/1998 | French et al. |
| 5,794,229 A | 8/1998 | French et al. |
| 5,798,769 A | 8/1998 | Chiu et al. |
| 5,819,226 A | 10/1998 | Gopinathan et al. |
| 5,819,238 A | 10/1998 | Fernholz |
| 5,826,021 A | 10/1998 | Mastors et al. |
| 5,832,218 A | 11/1998 | Gibbs et al. |
| 5,845,300 A | 12/1998 | Comer |
| 5,845,530 A | 12/1998 | Brockmeyer et al. |
| 5,857,329 A | 1/1999 | Bingham |
| 5,872,973 A | 2/1999 | Mitchell et al. |
| 5,878,434 A | 3/1999 | Draper et al. |
| 5,892,900 A | 4/1999 | Ginter et al. |
| 5,897,636 A | 4/1999 | Kaeser |
| 5,902,349 A | 5/1999 | Endo et al. |
| 5,911,138 A | 6/1999 | Li et al. |
| 5,918,225 A | 6/1999 | White et al. |
| 5,966,706 A | 10/1999 | Biliris et al. |
| 5,999,911 A * | 12/1999 | Berg .............. G06F 17/50 705/7.13 |
| 6,006,242 A | 12/1999 | Poole et al. |
| 6,012,042 A | 1/2000 | Black et al. |
| 6,057,757 A | 5/2000 | Arrowsmith et al. |
| 6,065,026 A | 5/2000 | Cornelia et al. |
| 6,072,942 A | 6/2000 | Stockwell et al. |
| 6,091,956 A | 7/2000 | Hollenberg |
| 6,094,643 A | 7/2000 | Anderson et al. |
| 6,104,401 A | 8/2000 | Parsons |
| 6,134,582 A | 10/2000 | Kennedy |
| 6,161,098 A | 12/2000 | Wallman |
| 6,189,005 B1 | 2/2001 | Chakrabarti et al. |
| 6,208,985 B1 | 3/2001 | Krehel |
| 6,219,053 B1 | 4/2001 | Tachibana et al. |
| 6,232,971 B1 | 5/2001 | Haynes |
| 6,236,994 B1 | 5/2001 | Swartz et al. |
| 6,237,138 B1 | 5/2001 | Hameluck et al. |
| 6,243,706 B1 | 6/2001 | Moreau et al. |
| 6,243,717 B1 | 6/2001 | Gordon et al. |
| 6,247,019 B1 | 6/2001 | Davies |
| 6,279,018 B1 | 8/2001 | Kudrolli et al. |
| 6,289,334 B1 | 9/2001 | Reiner et al. |
| 6,289,338 B1 | 9/2001 | Stoffel et al. |
| 6,311,181 B1 | 10/2001 | Lee et al. |
| 6,313,833 B1 | 11/2001 | Knight |
| 6,321,274 B1 | 11/2001 | Shakib et al. |
| 6,341,310 B1 | 1/2002 | Leshem et al. |
| 6,349,315 B1 | 2/2002 | Sonoyama et al. |
| 6,366,933 B1 | 4/2002 | Ball et al. |
| 6,369,835 B1 | 4/2002 | Lin |
| 6,370,538 B1 * | 4/2002 | Lamping .............. G06F 9/4443 |
| 6,430,305 B1 | 8/2002 | Decker |
| 6,456,997 B1 | 9/2002 | Shukla |
| 6,463,404 B1 | 10/2002 | Appleby |
| 6,496,774 B1 | 12/2002 | Davies |
| 6,496,817 B1 | 12/2002 | Whang et al. |
| 6,513,019 B2 | 1/2003 | Lewis |
| 6,519,627 B1 | 2/2003 | Dan et al. |
| 6,523,019 B1 | 2/2003 | Borthwick |
| 6,532,449 B1 | 3/2003 | Goertzel et al. |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,608,559 B1 | 8/2003 | Lemelson et al. |
| 6,631,496 B1 | 10/2003 | Li et al. |
| 6,640,231 B1 | 10/2003 | Andersen et al. |
| 6,642,945 B1 | 11/2003 | Sharpe |
| 6,643,613 B2 | 11/2003 | McGee et al. |
| 6,662,202 B1 | 12/2003 | Krusche et al. |
| 6,665,683 B1 * | 12/2003 | Meltzer .............. G06F 17/30961 707/602 |
| 6,674,434 B1 | 1/2004 | Chojnacki et al. |
| 6,714,936 B1 | 3/2004 | Nevin, III |
| 6,745,382 B1 | 6/2004 | Zothner |
| 6,748,481 B1 | 6/2004 | Parry et al. |
| 6,775,675 B1 | 8/2004 | Nwabueze et al. |
| 6,801,201 B2 | 10/2004 | Escher |
| 6,820,135 B1 | 11/2004 | Dingman |
| 6,828,920 B2 | 12/2004 | Owen et al. |
| 6,839,745 B1 | 1/2005 | Dingari et al. |
| 6,851,108 B1 | 2/2005 | Syme et al. |
| 6,857,120 B1 | 2/2005 | Arnold et al. |
| 6,876,981 B1 | 4/2005 | Berckmans |
| 6,877,137 B1 | 4/2005 | Rivette et al. |
| 6,907,426 B2 | 6/2005 | Hellerstein et al. |
| 6,920,453 B2 | 7/2005 | Mannila et al. |
| 6,944,821 B1 | 9/2005 | Bates et al. |
| 6,976,024 B1 | 12/2005 | Chavez et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,028,223 B1 | 4/2006 | Kolawa et al. |
| 7,036,085 B2 | 4/2006 | Barros |
| 7,043,449 B1 | 5/2006 | Li et al. |
| 7,043,702 B2 | 5/2006 | Chi et al. |
| 7,055,110 B2 | 5/2006 | Kupka et al. |
| 7,058,648 B1 | 6/2006 | Lightfoot et al. |
| 7,085,890 B2 | 8/2006 | Kashyap |
| 7,086,028 B1 | 8/2006 | Davis et al. |
| 7,089,541 B2 | 8/2006 | Ungar |
| 7,111,231 B1 | 9/2006 | Huck et al. |
| 7,133,409 B1 | 11/2006 | Willardson |
| 7,139,800 B2 | 11/2006 | Bellotti et al. |
| 7,155,728 B1 | 12/2006 | Prabhu et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,174,377 B2 | 2/2007 | Bernard et al. |
| 7,181,423 B2 | 2/2007 | Blanchard et al. |
| 7,185,065 B1 | 2/2007 | Holtzman et al. |
| 7,216,133 B2 | 5/2007 | Wu et al. |
| 7,216,299 B2 | 5/2007 | Knight |
| 7,237,192 B1 | 6/2007 | Stephenson et al. |
| 7,240,330 B2 | 7/2007 | Fairweather |
| 7,246,090 B1 | 7/2007 | Thomas |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,356,504 B2 | 4/2008 | Muller |
| 7,370,047 B2 | 5/2008 | Gorman |
| 7,379,811 B2 | 5/2008 | Rasmussen et al. |
| 7,379,903 B2 | 5/2008 | Caballero et al. |
| 7,392,254 B1 | 6/2008 | Jenkins |

(56) References Cited

U.S. PATENT DOCUMENTS

| | | |
|---|---|---|
| 7,401,038 B2 | 7/2008 | Masuda |
| 7,403,921 B2 | 7/2008 | Tanpoco et al. |
| 7,403,922 B1 | 7/2008 | Lewis et al. |
| 7,403,942 B1 | 7/2008 | Bayliss |
| 7,406,592 B1 | 7/2008 | Polyudov |
| 7,409,357 B2 | 8/2008 | Schaf et al. |
| 7,426,654 B2 | 9/2008 | Adams et al. |
| 7,437,728 B2 | 10/2008 | Stackhouse et al. |
| 7,454,466 B2 | 11/2008 | Bellotti et al. |
| 7,461,158 B2 | 12/2008 | Rider et al. |
| 7,467,375 B2 | 12/2008 | Tondreau et al. |
| 7,469,238 B2 | 12/2008 | Satchwell |
| 7,487,139 B2 | 2/2009 | Fraleigh et al. |
| 7,502,786 B2 | 3/2009 | Liu et al. |
| 7,519,589 B2 | 4/2009 | Charnock et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,533,069 B2 | 5/2009 | Fairweather |
| 7,542,934 B2 | 6/2009 | Markel |
| 7,546,245 B2 | 6/2009 | Surpin et al. |
| 7,546,353 B2 | 6/2009 | Hesselink et al. |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,587,352 B2 | 9/2009 | Arnott |
| 7,590,582 B2 | 9/2009 | Dunne |
| 7,596,285 B2 | 9/2009 | Brown et al. |
| 7,603,229 B2 | 10/2009 | Goldberg et al. |
| 7,610,290 B2 | 10/2009 | Kruy et al. |
| 7,614,006 B2 | 11/2009 | Molander |
| 7,617,232 B2 | 11/2009 | Gabbert et al. |
| 7,620,582 B2 | 11/2009 | Masuda |
| 7,620,628 B2 | 11/2009 | Kapur et al. |
| 7,627,489 B2 | 12/2009 | Schaeffer et al. |
| 7,627,812 B2 | 12/2009 | Chamberlain et al. |
| 7,630,931 B1 | 12/2009 | Rachev et al. |
| 7,634,717 B2 | 12/2009 | Chamberlain et al. |
| 7,640,173 B2 | 12/2009 | Surpin et al. |
| 7,657,478 B2 | 2/2010 | De Diego |
| 7,685,042 B1 | 3/2010 | Monroe et al. |
| 7,685,083 B2 | 3/2010 | Fairweather |
| 7,703,021 B1 | 4/2010 | Flam |
| 7,706,817 B2 | 4/2010 | Bamrah et al. |
| 7,712,049 B2 | 5/2010 | Williams et al. |
| 7,716,067 B2 | 5/2010 | Surpin et al. |
| 7,716,077 B1 | 5/2010 | Mikurak |
| 7,716,227 B1 | 5/2010 | Hao et al. |
| 7,725,530 B2 | 5/2010 | Sah et al. |
| 7,725,547 B2 | 5/2010 | Albertson et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,756,843 B1 | 7/2010 | Palmer |
| 7,757,220 B2 | 7/2010 | Griffith et al. |
| 7,770,100 B2 | 8/2010 | Chamberlain et al. |
| 7,783,679 B2 | 8/2010 | Bley |
| 7,805,457 B1 | 9/2010 | Viola et al. |
| 7,809,703 B2 | 10/2010 | Balabhadrapatruni et al. |
| 7,818,291 B2 | 10/2010 | Ferguson et al. |
| 7,818,658 B2 | 10/2010 | Chen |
| 7,835,966 B2 | 11/2010 | Satchwell |
| 7,848,995 B2 | 12/2010 | Dalal |
| 7,853,573 B2 | 12/2010 | Warner et al. |
| 7,870,493 B2 | 1/2011 | Pall et al. |
| 7,877,421 B2 | 1/2011 | Berger et al. |
| 7,880,921 B2 | 2/2011 | Dattilo et al. |
| 7,894,984 B2 | 2/2011 | Rasmussen et al. |
| 7,899,611 B2 | 3/2011 | Downs et al. |
| 7,904,913 B2 | 3/2011 | Sim-Tang et al. |
| 7,908,521 B2 | 3/2011 | Sridharan et al. |
| 7,912,842 B1 | 3/2011 | Bayliss |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,958,147 B1 | 6/2011 | Turner et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 6/2011 | Caro et al. |
| 7,979,424 B2 | 7/2011 | Dettinger et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,041,714 B2 | 10/2011 | Aymeloglu et al. |
| 8,042,110 B1 | 10/2011 | Kawahara et al. |
| 8,046,283 B2 | 10/2011 | Burns |
| 8,054,756 B2 | 11/2011 | Chand et al. |
| 8,073,857 B2 | 12/2011 | Sreekanth |
| 8,082,172 B2 | 12/2011 | Chao et al. |
| 8,103,543 B1 | 1/2012 | Zwicky |
| 8,103,962 B2 | 1/2012 | Embley et al. |
| 8,112,425 B2 | 2/2012 | Baum et al. |
| 8,117,022 B2 | 2/2012 | Linker |
| 8,126,848 B2 | 2/2012 | Wagner |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,326,727 B2 | 12/2012 | Aymeloglu et al. |
| 8,352,174 B2 | 1/2013 | Milstein et al. |
| 8,352,881 B2 | 1/2013 | Champion et al. |
| 8,364,642 B1 | 1/2013 | Garrod |
| 8,368,695 B2 | 2/2013 | Howell et al. |
| 8,397,171 B2 | 3/2013 | Klassen et al. |
| 8,412,707 B1 | 4/2013 | Mianji |
| 8,417,409 B2 | 4/2013 | Bast et al. |
| 8,417,715 B1 | 4/2013 | Bruckhaus et al. |
| 8,429,194 B2 | 4/2013 | Aymeloglu et al. |
| 8,429,827 B1 | 4/2013 | Arbogast |
| 8,433,702 B1 | 4/2013 | Carrino et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,484,549 B2 | 7/2013 | Burr et al. |
| 8,489,331 B2 | 7/2013 | Kopf et al. |
| 8,489,641 B1 | 7/2013 | Seefeld et al. |
| 8,494,941 B2 | 7/2013 | Aymeloglu et al. |
| 8,498,984 B1 | 7/2013 | Hwang et al. |
| 8,499,287 B2 | 7/2013 | Shafi et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,554,719 B2 | 10/2013 | McGrew |
| 8,560,413 B1 | 10/2013 | Quarterman |

(56) References Cited

U.S. PATENT DOCUMENTS

| | | |
|---|---|---|
| 8,560,494 B1 | 10/2013 | Downing |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,600,872 B1 | 12/2013 | Yan |
| 8,601,326 B1 | 12/2013 | Kirn |
| 8,620,641 B2 | 12/2013 | Farnsworth et al. |
| 8,639,552 B1 | 1/2014 | Chen |
| 8,639,757 B1 | 1/2014 | Zang et al. |
| 8,645,332 B1 | 2/2014 | Cohen et al. |
| 8,646,080 B2 | 2/2014 | Williamson et al. |
| 8,666,861 B2 | 3/2014 | Li et al. |
| 8,676,857 B1 | 3/2014 | Adams et al. |
| 8,688,573 B1 | 4/2014 | Rukonic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,732,574 B2 | 5/2014 | Burr et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,763,078 B1 | 6/2014 | Castellucci |
| 8,781,169 B2 | 7/2014 | Jackson et al. |
| 8,786,605 B1 | 7/2014 | Curtis et al. |
| 8,787,939 B2 | 7/2014 | Papakipos et al. |
| 8,788,407 B1 | 7/2014 | Singh et al. |
| 8,798,354 B1 | 8/2014 | Bunzel et al. |
| 8,799,799 B1 | 8/2014 | Cervelli et al. |
| 8,799,867 B1 | 8/2014 | Peri-Glass et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,903,717 B2 | 12/2014 | Elliot |
| 8,909,597 B2 | 12/2014 | Aymeloglu et al. |
| 8,909,656 B2 | 12/2014 | Kumar et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,429 B1 | 12/2014 | Fisher et al. |
| 8,924,872 B1 | 12/2014 | Bogomolov et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 8,949,164 B1 | 2/2015 | Mohler |
| 8,984,390 B2 | 3/2015 | Aymeloglu et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,031,981 B1 | 5/2015 | Potter et al. |
| 9,032,531 B1 | 5/2015 | Scorvo et al. |
| 9,043,696 B1 | 5/2015 | Meiklejohn et al. |
| 9,043,894 B1 | 5/2015 | Dennison et al. |
| 9,092,482 B2 | 7/2015 | Harris et al. |
| 9,100,428 B1 | 8/2015 | Visbal |
| 9,105,000 B1 | 8/2015 | White et al. |
| 9,116,975 B2 | 8/2015 | Shankar et al. |
| 9,129,219 B1 | 9/2015 | Robertson et al. |
| 9,229,966 B2 | 1/2016 | Aymeloglu et al. |
| 9,280,532 B2 | 3/2016 | Cicerone |
| 9,292,388 B2 | 3/2016 | Fisher et al. |
| 9,330,120 B2 | 5/2016 | Colgrove et al. |
| 9,348,677 B2 | 5/2016 | Marinelli, III et al. |
| 9,367,463 B2 | 6/2016 | Biswal et al. |
| 9,449,074 B1 | 9/2016 | Fisher et al. |
| 2001/0011243 A1 | 8/2001 | Dembo et al. |
| 2001/0021936 A1 | 9/2001 | Bertram |
| 2001/0027424 A1 | 10/2001 | Torigoe |
| 2002/0007329 A1 | 1/2002 | Alcaly et al. |
| 2002/0007331 A1 | 1/2002 | Lo et al. |
| 2002/0026404 A1 | 2/2002 | Thompson |
| 2002/0030701 A1 | 3/2002 | Knight |
| 2002/0032677 A1 | 3/2002 | Morgenthaler et al. |
| 2002/0033848 A1 | 3/2002 | Sciammarella et al. |
| 2002/0035590 A1 | 3/2002 | Eibach et al. |
| 2002/0040336 A1 | 4/2002 | Blanchard et al. |
| 2002/0059126 A1 | 5/2002 | Ricciardi |
| 2002/0065708 A1 | 5/2002 | Senay et al. |
| 2002/0087570 A1 | 7/2002 | Jacquez et al. |
| 2002/0091707 A1 | 7/2002 | Keller |
| 2002/0095360 A1 | 7/2002 | Joao |
| 2002/0095658 A1 | 7/2002 | Shulman |
| 2002/0099870 A1 | 7/2002 | Miller et al. |
| 2002/0103705 A1 | 8/2002 | Brady |
| 2002/0116120 A1 | 8/2002 | Ruiz et al. |
| 2002/0130907 A1 | 9/2002 | Chi et al. |
| 2002/0138383 A1 | 9/2002 | Rhee |
| 2002/0147671 A1 | 10/2002 | Sloan et al. |
| 2002/0156812 A1 | 10/2002 | Krasnoiarov et al. |
| 2002/0174201 A1 | 11/2002 | Ramer et al. |
| 2002/0184111 A1 | 12/2002 | Swanson |
| 2002/0194119 A1 | 12/2002 | Wright et al. |
| 2003/0004770 A1 | 1/2003 | Miller et al. |
| 2003/0009392 A1 | 1/2003 | Perkowski |
| 2003/0009399 A1 | 1/2003 | Boerner |
| 2003/0023620 A1 | 1/2003 | Trotta |
| 2003/0028560 A1 | 2/2003 | Kudrolli et al. |
| 2003/0039948 A1 | 2/2003 | Donahue |
| 2003/0065605 A1 | 4/2003 | Gatto |
| 2003/0065606 A1 | 4/2003 | Satchwell |
| 2003/0065607 A1 | 4/2003 | Satchwell |
| 2003/0078827 A1 | 4/2003 | Hoffman |
| 2003/0093401 A1 | 5/2003 | Czahkowski et al. |
| 2003/0093755 A1* | 5/2003 | O'Carroll ............ G06F 17/218 715/205 |
| 2003/0105759 A1 | 6/2003 | Bess et al. |
| 2003/0105833 A1 | 6/2003 | Daniels |
| 2003/0115481 A1 | 6/2003 | Baird et al. |
| 2003/0126102 A1 | 7/2003 | Borthwick |
| 2003/0130996 A1 | 7/2003 | Bayerl et al. |
| 2003/0140106 A1 | 7/2003 | Raguseo |
| 2003/0144868 A1 | 7/2003 | MacLntyre et al. |
| 2003/0163352 A1 | 8/2003 | Surpin et al. |
| 2003/0167423 A1 | 9/2003 | Murakami et al. |
| 2003/0172021 A1 | 9/2003 | Huang |
| 2003/0172053 A1 | 9/2003 | Fairweather |
| 2003/0177112 A1 | 9/2003 | Gardner |
| 2003/0182177 A1 | 9/2003 | Gallagher |
| 2003/0182313 A1 | 9/2003 | Federwisch et al. |
| 2003/0184588 A1 | 10/2003 | Lee |
| 2003/0187761 A1 | 10/2003 | Olsen et al. |
| 2003/0200217 A1 | 10/2003 | Ackerman |
| 2003/0212670 A1 | 11/2003 | Yalamanchi et al. |
| 2003/0212718 A1 | 11/2003 | Tester |
| 2003/0225755 A1 | 12/2003 | Lwayama et al. |
| 2003/0229848 A1 | 12/2003 | Arend et al. |
| 2004/0003009 A1 | 1/2004 | Wilmot |
| 2004/0006523 A1 | 1/2004 | Coker |
| 2004/0032432 A1 | 2/2004 | Baynger |
| 2004/0034570 A1 | 2/2004 | Davis |
| 2004/0044648 A1 | 3/2004 | Anfindsen et al. |
| 2004/0083466 A1 | 4/2004 | Dapp et al. |
| 2004/0085318 A1 | 5/2004 | Hassler et al. |
| 2004/0088177 A1 | 5/2004 | Travis et al. |
| 2004/0095349 A1 | 5/2004 | Bito et al. |
| 2004/0098731 A1 | 5/2004 | Demsey et al. |
| 2004/0103088 A1 | 5/2004 | Cragun et al. |
| 2004/0103124 A1 | 5/2004 | Kupkova |
| 2004/0111410 A1 | 6/2004 | Burgoon et al. |
| 2004/0111480 A1 | 6/2004 | Yue |
| 2004/0117387 A1 | 6/2004 | Civetta et al. |
| 2004/0126840 A1 | 7/2004 | Cheng et al. |
| 2004/0133500 A1 | 7/2004 | Thompson et al. |
| 2004/0139212 A1 | 7/2004 | Mukherjee et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0153451 A1 | 8/2004 | Phillips et al. |
| 2004/0153837 A1 | 8/2004 | Preston et al. |
| 2004/0163039 A1 | 8/2004 | Gorman |
| 2004/0181554 A1 | 9/2004 | Heckerman et al. |
| 2004/0193599 A1 | 9/2004 | Liu et al. |

(56) References Cited

U.S. PATENT DOCUMENTS

| | | |
|---|---|---|
| 2004/0193600 A1 | 9/2004 | Kaasten et al. |
| 2004/0193608 A1 | 9/2004 | Gollapudi et al. |
| 2004/0205492 A1 | 10/2004 | Newsome |
| 2004/0210763 A1 | 10/2004 | Jonas |
| 2004/0221223 A1 | 11/2004 | Yu et al. |
| 2004/0236688 A1 | 11/2004 | Bozeman |
| 2004/0254658 A1 | 12/2004 | Sherriff et al. |
| 2004/0260702 A1 | 12/2004 | Cragun et al. |
| 2004/0267746 A1 | 12/2004 | Marcjan et al. |
| 2005/0004911 A1 | 1/2005 | Goldberg et al. |
| 2005/0010472 A1 | 1/2005 | Quatse et al. |
| 2005/0021397 A1 | 1/2005 | Cui et al. |
| 2005/0021877 A1 | 1/2005 | Varpela et al. |
| 2005/0027632 A1 | 2/2005 | Zeitoun et al. |
| 2005/0027705 A1 | 2/2005 | Sadri et al. |
| 2005/0028094 A1 | 2/2005 | Allyn |
| 2005/0039116 A1 | 2/2005 | Slack-Smith |
| 2005/0039119 A1 | 2/2005 | Parks et al. |
| 2005/0060712 A1 | 3/2005 | Miller et al. |
| 2005/0060713 A1 | 3/2005 | Miller et al. |
| 2005/0065811 A1 | 3/2005 | Chu et al. |
| 2005/0075962 A1 | 4/2005 | Dunne |
| 2005/0075966 A1 | 4/2005 | Duka |
| 2005/0080769 A1 | 4/2005 | Gemmell |
| 2005/0086207 A1 | 4/2005 | Heuer et al. |
| 2005/0090911 A1 | 4/2005 | Ingargiola et al. |
| 2005/0091186 A1 | 4/2005 | Elish |
| 2005/0097441 A1 | 5/2005 | Herbach et al. |
| 2005/0108001 A1 | 5/2005 | Aarskog |
| 2005/0120080 A1 | 6/2005 | Weinreb et al. |
| 2005/0125715 A1 | 6/2005 | Di Franco et al. |
| 2005/0131935 A1 | 6/2005 | O'Leary et al. |
| 2005/0133588 A1 | 6/2005 | Williams |
| 2005/0149455 A1 | 7/2005 | Bruesewitz et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0171881 A1 | 8/2005 | Ghassemieh et al. |
| 2005/0180330 A1 | 8/2005 | Shapiro |
| 2005/0182709 A1 | 8/2005 | Belcsak et al. |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0226473 A1 | 10/2005 | Ramesh |
| 2005/0246327 A1 | 11/2005 | Yeung et al. |
| 2005/0251786 A1 | 11/2005 | Citron et al. |
| 2005/0256703 A1 | 11/2005 | Markel |
| 2005/0262004 A1 | 11/2005 | Sakata et al. |
| 2005/0262057 A1 | 11/2005 | Lesh et al. |
| 2005/0262493 A1 | 11/2005 | Schmidt et al. |
| 2005/0262512 A1 | 11/2005 | Schmidt et al. |
| 2005/0278286 A1 | 12/2005 | Djugash et al. |
| 2006/0004740 A1 | 1/2006 | Dettinger et al. |
| 2006/0010130 A1 | 1/2006 | Leff et al. |
| 2006/0020398 A1 | 1/2006 | Vernon et al. |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0047590 A1 | 3/2006 | Anderson |
| 2006/0052984 A1 | 3/2006 | Nakadate et al. |
| 2006/0053170 A1 | 3/2006 | Hill et al. |
| 2006/0059072 A1 | 3/2006 | Boglaev |
| 2006/0059139 A1 | 3/2006 | Robinson |
| 2006/0064181 A1 | 3/2006 | Kato |
| 2006/0070046 A1 | 3/2006 | Balakrishnan et al. |
| 2006/0074730 A1 | 4/2006 | Shukla et al. |
| 2006/0074866 A1 | 4/2006 | Chamberlain et al. |
| 2006/0074881 A1 | 4/2006 | Vembu et al. |
| 2006/0074967 A1 | 4/2006 | Shaburov |
| 2006/0080316 A1 | 4/2006 | Gilmore et al. |
| 2006/0080616 A1 | 4/2006 | Vogel et al. |
| 2006/0080619 A1 | 4/2006 | Carlson et al. |
| 2006/0093222 A1 | 5/2006 | Saffer et al. |
| 2006/0116943 A1 | 6/2006 | Willain |
| 2006/0116991 A1 | 6/2006 | Calderwood |
| 2006/0129746 A1 | 6/2006 | Porter |
| 2006/0129992 A1 | 6/2006 | Oberholtzer et al. |
| 2006/0136513 A1 | 6/2006 | Ngo et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0155654 A1* | 7/2006 | Plessis ............... G06Q 30/0283 705/400 |
| 2006/0203337 A1 | 9/2006 | White |
| 2006/0209085 A1 | 9/2006 | Wong et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0218637 A1 | 9/2006 | Thomas et al. |
| 2006/0224356 A1 | 10/2006 | Castelli et al. |
| 2006/0235786 A1 | 10/2006 | Disalvo |
| 2006/0241856 A1 | 10/2006 | Cobleigh et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0253502 A1 | 11/2006 | Raman et al. |
| 2006/0265311 A1 | 11/2006 | Dean et al. |
| 2006/0265397 A1 | 11/2006 | Bryan et al. |
| 2006/0265417 A1 | 11/2006 | Amato et al. |
| 2006/0271277 A1 | 11/2006 | Hu et al. |
| 2006/0271838 A1 | 11/2006 | Carro |
| 2006/0271884 A1 | 11/2006 | Hurst |
| 2006/0277460 A1 | 12/2006 | Forstall et al. |
| 2006/0279630 A1 | 12/2006 | Aggarwal et al. |
| 2006/0288046 A1 | 12/2006 | Gupta et al. |
| 2007/0000999 A1 | 1/2007 | Kubo et al. |
| 2007/0005582 A1 | 1/2007 | Navratil et al. |
| 2007/0011150 A1 | 1/2007 | Frank |
| 2007/0011304 A1 | 1/2007 | Error |
| 2007/0016363 A1 | 1/2007 | Huang et al. |
| 2007/0027851 A1 | 2/2007 | Kruy et al. |
| 2007/0038646 A1 | 2/2007 | Thota |
| 2007/0038962 A1 | 2/2007 | Thota |
| 2007/0055598 A1 | 2/2007 | Fuchs et al. |
| 2007/0055599 A1 | 3/2007 | Arnott et al. |
| 2007/0057966 A1 | 3/2007 | Arnott |
| 2007/0061259 A1 | 3/2007 | Ohno et al. |
| 2007/0061752 A1 | 3/2007 | Zoldi et al. |
| 2007/0067233 A1 | 3/2007 | Cory |
| 2007/0067285 A1 | 3/2007 | Dalal |
| 2007/0078832 A1 | 3/2007 | Blume |
| 2007/0083541 A1 | 4/2007 | Ott et al. |
| 2007/0088596 A1 | 4/2007 | Fraleigh et al. |
| 2007/0091868 A1 | 4/2007 | Berkelhamer et al. |
| 2007/0094248 A1 | 4/2007 | Hollman et al. |
| 2007/0094312 A1 | 4/2007 | McVeigh et al. |
| 2007/0094389 A1 | 4/2007 | Nussey et al. |
| 2007/0106582 A1 | 5/2007 | Baker et al. |
| 2007/0112714 A1 | 5/2007 | Fairweather |
| 2007/0113164 A1 | 5/2007 | Hansen et al. |
| 2007/0118527 A1 | 5/2007 | Winje et al. |
| 2007/0136115 A1 | 6/2007 | Doganaksoy et al. |
| 2007/0150369 A1 | 6/2007 | Zivin |
| 2007/0150801 A1 | 6/2007 | Chidlovskii et al. |
| 2007/0150805 A1 | 6/2007 | Misovski |
| 2007/0156673 A1 | 7/2007 | Maga |
| 2007/0168269 A1 | 7/2007 | Chuo |
| 2007/0168270 A1 | 7/2007 | De Diego Arozamena et al. |
| 2007/0168336 A1 | 7/2007 | Ransil et al. |
| 2007/0168871 A1 | 7/2007 | Jenkins et al. |
| 2007/0174760 A1 | 7/2007 | Chamberlain et al. |
| 2007/0178501 A1 | 7/2007 | Chamberlain et al. |
| 2007/0185867 A1 | 8/2007 | Maga |
| 2007/0192265 A1 | 8/2007 | Chopin et al. |
| 2007/0192281 A1 | 8/2007 | Cradick et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |

(56) References Cited

U.S. PATENT DOCUMENTS

| | | |
|---|---|---|
| 2007/0208736 A1 | 9/2007 | Tanigawa et al. |
| 2007/0219882 A1 | 9/2007 | May |
| 2007/0220604 A1 | 9/2007 | Long |
| 2007/0226617 A1 | 9/2007 | Traub et al. |
| 2007/0233709 A1 | 10/2007 | Abnous |
| 2007/0233756 A1 | 10/2007 | D'Souza et al. |
| 2007/0239606 A1 | 10/2007 | Eisen |
| 2007/0240062 A1 | 10/2007 | Christena et al. |
| 2007/0245339 A1 | 10/2007 | Bauman et al. |
| 2007/0260582 A1 | 11/2007 | Liang |
| 2007/0266336 A1 | 11/2007 | Nojima et al. |
| 2007/0271317 A1 | 11/2007 | Carmel |
| 2007/0282951 A1 | 12/2007 | Selimis et al. |
| 2007/0284433 A1 | 12/2007 | Domenica et al. |
| 2007/0294643 A1 | 12/2007 | Kyle |
| 2007/0299697 A1 | 12/2007 | Friedlander et al. |
| 2008/0005063 A1 | 1/2008 | Seeds |
| 2008/0015920 A1 | 1/2008 | Fawls et al. |
| 2008/0016155 A1 | 1/2008 | Khalatian |
| 2008/0016216 A1 | 1/2008 | Worley et al. |
| 2008/0040250 A1 | 2/2008 | Salter |
| 2008/0040684 A1 | 2/2008 | Crump |
| 2008/0046481 A1 | 2/2008 | Gould et al. |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0091693 A1 | 4/2008 | Murthy |
| 2008/0097816 A1* | 4/2008 | Freire .................. G06Q 10/063 705/7.26 |
| 2008/0103798 A1 | 5/2008 | Domenikos et al. |
| 2008/0103996 A1 | 5/2008 | Forman et al. |
| 2008/0104019 A1 | 5/2008 | Nath |
| 2008/0104407 A1 | 5/2008 | Horne et al. |
| 2008/0109714 A1 | 5/2008 | Kumar et al. |
| 2008/0126344 A1 | 5/2008 | Hoffman et al. |
| 2008/0126951 A1 | 5/2008 | Sood et al. |
| 2008/0133310 A1 | 6/2008 | Kim et al. |
| 2008/0140387 A1 | 6/2008 | Linker |
| 2008/0140576 A1 | 6/2008 | Lewis et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0172607 A1 | 7/2008 | Baer |
| 2008/0177782 A1 | 7/2008 | Poston et al. |
| 2008/0183639 A1 | 7/2008 | Disalvo |
| 2008/0195417 A1 | 8/2008 | Surpin et al. |
| 2008/0195608 A1 | 8/2008 | Clover |
| 2008/0195672 A1 | 8/2008 | Hamel et al. |
| 2008/0196016 A1 | 8/2008 | Todd |
| 2008/0201313 A1 | 8/2008 | Dettinger et al. |
| 2008/0208820 A1 | 8/2008 | Usey et al. |
| 2008/0215543 A1 | 9/2008 | Huang et al. |
| 2008/0215546 A1 | 9/2008 | Baum et al. |
| 2008/0222295 A1 | 9/2008 | Robinson et al. |
| 2008/0228467 A1 | 9/2008 | Womack et al. |
| 2008/0243711 A1 | 10/2008 | Aymeloglu et al. |
| 2008/0243799 A1 | 10/2008 | Rozich et al. |
| 2008/0249845 A1 | 10/2008 | Aronowich et al. |
| 2008/0249957 A1 | 10/2008 | Masuyama et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0267386 A1 | 10/2008 | Cooper |
| 2008/0270316 A1 | 10/2008 | Guidotti et al. |
| 2008/0276167 A1 | 11/2008 | Michael |
| 2008/0278311 A1 | 11/2008 | Grange et al. |
| 2008/0281580 A1 | 11/2008 | Zabokritski |
| 2008/0288306 A1 | 11/2008 | MacLntyre et al. |
| 2008/0288471 A1 | 11/2008 | Wu et al. |
| 2008/0301042 A1 | 12/2008 | Patzer |
| 2008/0301559 A1 | 12/2008 | Martinsen et al. |
| 2008/0301643 A1 | 12/2008 | Appleton et al. |
| 2008/0313132 A1 | 12/2008 | Hao et al. |
| 2008/0313281 A1 | 12/2008 | Scheidl et al. |
| 2009/0002492 A1 | 1/2009 | Velipasalar et al. |
| 2009/0006150 A1 | 1/2009 | Prigge et al. |
| 2009/0006271 A1 | 1/2009 | Crowder |
| 2009/0007056 A1 | 1/2009 | Prigge et al. |
| 2009/0018996 A1 | 1/2009 | Hunt et al. |
| 2009/0027418 A1 | 1/2009 | Maru et al. |
| 2009/0030915 A1 | 1/2009 | Winter et al. |
| 2009/0031401 A1 | 1/2009 | Cudich et al. |
| 2009/0037912 A1 | 2/2009 | Stoitsev et al. |
| 2009/0043762 A1 | 2/2009 | Shiverick et al. |
| 2009/0055251 A1 | 2/2009 | Shah et al. |
| 2009/0055487 A1 | 2/2009 | Moraes et al. |
| 2009/0076845 A1 | 3/2009 | Bellin et al. |
| 2009/0083275 A1 | 3/2009 | Jacob et al. |
| 2009/0088964 A1 | 4/2009 | Schaaf et al. |
| 2009/0089651 A1 | 4/2009 | Herberger et al. |
| 2009/0094166 A1 | 4/2009 | Aymeloglu et al. |
| 2009/0094217 A1 | 4/2009 | Dettinger et al. |
| 2009/0106178 A1 | 4/2009 | Chu |
| 2009/0106242 A1 | 4/2009 | McGrew |
| 2009/0106308 A1 | 4/2009 | Killian et al. |
| 2009/0112678 A1 | 4/2009 | Luzardo |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0144747 A1 | 6/2009 | Baker |
| 2009/0150868 A1 | 6/2009 | Chakra et al. |
| 2009/0161147 A1 | 6/2009 | Klave |
| 2009/0164387 A1 | 6/2009 | Armstrong et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172674 A1 | 7/2009 | Bobak et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0187556 A1 | 7/2009 | Ross et al. |
| 2009/0193012 A1 | 7/2009 | Williams |
| 2009/0193050 A1 | 7/2009 | Olson |
| 2009/0199047 A1 | 8/2009 | Vaitheeswaran et al. |
| 2009/0199106 A1 | 8/2009 | Jonsson et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0228365 A1 | 9/2009 | Tomchek et al. |
| 2009/0228507 A1 | 9/2009 | Jain et al. |
| 2009/0234720 A1 | 9/2009 | George et al. |
| 2009/0248721 A1 | 10/2009 | Burton et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0299830 A1 | 12/2009 | West et al. |
| 2009/0307049 A1 | 12/2009 | Elliott et al. |
| 2009/0313250 A1 | 12/2009 | Folting et al. |
| 2009/0313311 A1 | 12/2009 | Hoffmann et al. |
| 2009/0313463 A1 | 12/2009 | Pang et al. |
| 2009/0319418 A1 | 12/2009 | Herz |
| 2009/0319891 A1 | 12/2009 | MacKinlay |
| 2009/0319996 A1 | 12/2009 | Shafi et al. |
| 2009/0327157 A1 | 12/2009 | Dunne |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |

(56) References Cited

U.S. PATENT DOCUMENTS

| | | |
|---|---|---|
| 2010/0057600 A1 | 3/2010 | Johansen et al. |
| 2010/0057622 A1 | 3/2010 | Faith et al. |
| 2010/0057716 A1 | 3/2010 | Stefik et al. |
| 2010/0070426 A1 | 3/2010 | Aymeloglu et al. |
| 2010/0070427 A1 | 3/2010 | Aymeloglu et al. |
| 2010/0070464 A1 | 3/2010 | Aymeloglu et al. |
| 2010/0070489 A1 | 3/2010 | Aymeloglu et al. |
| 2010/0070523 A1 | 3/2010 | Delgo et al. |
| 2010/0070531 A1 | 3/2010 | Aymeloglu et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0073315 A1 | 3/2010 | Lee et al. |
| 2010/0082541 A1 | 4/2010 | Kottomtharayil |
| 2010/0082671 A1 | 4/2010 | Li et al. |
| 2010/0094765 A1 | 4/2010 | Nandy |
| 2010/0098318 A1 | 4/2010 | Anderson |
| 2010/0100963 A1 | 4/2010 | Mahaffey |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0131502 A1 | 5/2010 | Fordham |
| 2010/0145902 A1 | 6/2010 | Boyan et al. |
| 2010/0145909 A1 | 6/2010 | Ngo |
| 2010/0161646 A1 | 6/2010 | Ceballos et al. |
| 2010/0161735 A1 | 6/2010 | Sharma |
| 2010/0162176 A1 | 6/2010 | Dunton |
| 2010/0162371 A1 | 6/2010 | Geil |
| 2010/0169192 A1 | 7/2010 | Zoldi et al. |
| 2010/0169376 A1 | 7/2010 | Chu |
| 2010/0169405 A1 | 7/2010 | Zhang |
| 2010/0191563 A1 | 7/2010 | Schlaifer et al. |
| 2010/0198684 A1 | 8/2010 | Eraker et al. |
| 2010/0199167 A1 | 8/2010 | Uematsu et al. |
| 2010/0199225 A1 | 8/2010 | Coleman et al. |
| 2010/0204983 A1 | 8/2010 | Chung et al. |
| 2010/0223260 A1 | 9/2010 | Wu |
| 2010/0228812 A1 | 9/2010 | Uomini |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0283787 A1 | 11/2010 | Hamedi et al. |
| 2010/0293174 A1 | 11/2010 | Bennett et al. |
| 2010/0306285 A1 | 12/2010 | Shah et al. |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0313239 A1 | 12/2010 | Chakra et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004626 A1 | 1/2011 | Naeymi-Rad et al. |
| 2011/0029526 A1 | 2/2011 | Knight et al. |
| 2011/0035396 A1 | 2/2011 | Merz et al. |
| 2011/0041084 A1 | 2/2011 | Karam |
| 2011/0047159 A1 | 2/2011 | Baid et al. |
| 2011/0055074 A1 | 3/2011 | Chen et al. |
| 2011/0060753 A1 | 3/2011 | Shaked |
| 2011/0061013 A1 | 3/2011 | Bilicki et al. |
| 2011/0066497 A1 | 3/2011 | Gopinath et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce et al. |
| 2011/0093490 A1 | 4/2011 | Schindlauer et al. |
| 2011/0099133 A1 | 4/2011 | Chang et al. |
| 2011/0099628 A1 | 4/2011 | Lanxner et al. |
| 2011/0117878 A1 | 5/2011 | Barash et al. |
| 2011/0119100 A1 | 5/2011 | Ruhl et al. |
| 2011/0131082 A1 | 6/2011 | Manser et al. |
| 2011/0131122 A1 | 6/2011 | Griffin et al. |
| 2011/0131547 A1 | 6/2011 | Elaasar |
| 2011/0137766 A1 | 6/2011 | Rasmussen et al. |
| 2011/0145401 A1 | 6/2011 | Westlake |
| 2011/0153384 A1 | 6/2011 | Horne et al. |
| 2011/0153592 A1 | 6/2011 | Demarcken |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0179042 A1 | 7/2011 | Aymeloglu et al. |
| 2011/0185316 A1 | 7/2011 | Reid et al. |
| 2011/0185401 A1 | 7/2011 | Bak et al. |
| 2011/0208565 A1 | 8/2011 | Ross et al. |
| 2011/0208724 A1 | 8/2011 | Jones et al. |
| 2011/0208822 A1 | 8/2011 | Rathod |
| 2011/0213655 A1 | 9/2011 | Henkin |
| 2011/0218934 A1 | 9/2011 | Elser |
| 2011/0218955 A1 | 9/2011 | Tang |
| 2011/0219450 A1 | 9/2011 | McDougal et al. |
| 2011/0225198 A1 | 9/2011 | Edwards et al. |
| 2011/0225482 A1 | 9/2011 | Chan et al. |
| 2011/0225586 A1 | 9/2011 | Bentley et al. |
| 2011/0231305 A1 | 9/2011 | Winters |
| 2011/0238495 A1 | 9/2011 | Kang |
| 2011/0251951 A1 | 10/2011 | Kolkowtiz |
| 2011/0252282 A1 | 10/2011 | Meek et al. |
| 2011/0258072 A1 | 10/2011 | Kerker et al. |
| 2011/0258158 A1 | 10/2011 | Resende et al. |
| 2011/0258216 A1 | 10/2011 | Supakkul et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0270871 A1 | 11/2011 | He et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2011/0321008 A1 | 12/2011 | Jhoney et al. |
| 2012/0011238 A1 | 1/2012 | Rathod |
| 2012/0011245 A1 | 1/2012 | Gillette et al. |
| 2012/0013684 A1 | 1/2012 | Robertson et al. |
| 2012/0019559 A1 | 1/2012 | Siler et al. |
| 2012/0022945 A1 | 1/2012 | Falkenborg et al. |
| 2012/0030140 A1 | 2/2012 | Aymeloglu et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0078595 A1 | 3/2012 | Balandin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084287 A1 | 4/2012 | Lakshminarayan et al. |
| 2012/0101952 A1 | 4/2012 | Raleigh et al. |
| 2012/0102022 A1 | 4/2012 | Miranker et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0136804 A1 | 5/2012 | Lucia |
| 2012/0137235 A1 | 5/2012 | Ts et al. |
| 2012/0143816 A1 | 6/2012 | Zhang et al. |
| 2012/0144335 A1 | 6/2012 | Abeln et al. |
| 2012/0158585 A1 | 6/2012 | Ganti |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0159449 A1 | 6/2012 | Arnold et al. |

(56) References Cited

U.S. PATENT DOCUMENTS

| | | |
|---|---|---|
| 2012/0170847 A1 | 7/2012 | Tsukidate |
| 2012/0173381 A1 | 7/2012 | Smith |
| 2012/0173985 A1 | 7/2012 | Peppel |
| 2012/0174057 A1 | 7/2012 | Narendra et al. |
| 2012/0180002 A1 | 7/2012 | Campbell et al. |
| 2012/0188252 A1 | 7/2012 | Law |
| 2012/0191446 A1 | 7/2012 | Binsztok et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0278249 A1 | 11/2012 | Duggal et al. |
| 2012/0284345 A1 | 11/2012 | Costenaro et al. |
| 2012/0284719 A1 | 11/2012 | Phan et al. |
| 2012/0290506 A1 | 11/2012 | Muramatsu et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0024731 A1 | 1/2013 | Shochat et al. |
| 2013/0036346 A1 | 2/2013 | Cicerone |
| 2013/0046635 A1 | 2/2013 | Grigg et al. |
| 2013/0046842 A1 | 2/2013 | Muntz et al. |
| 2013/0054306 A1 | 2/2013 | Bhalla |
| 2013/0054551 A1 | 2/2013 | Lange |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096968 A1 | 4/2013 | Van Pelt et al. |
| 2013/0096988 A1 | 4/2013 | Grossman et al. |
| 2013/0097130 A1 | 4/2013 | Bingol et al. |
| 2013/0097482 A1 | 4/2013 | Marantz et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0124193 A1 | 5/2013 | Holmberg |
| 2013/0132348 A1 | 5/2013 | Garrod |
| 2013/0101159 A1 | 6/2013 | Chao et al. |
| 2013/0150004 A1 | 6/2013 | Rosen |
| 2013/0151148 A1 | 6/2013 | Parundekar et al. |
| 2013/0151305 A1* | 6/2013 | Akinola ............... G06Q 10/067 705/7.25 |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0198624 A1 | 8/2013 | Aymeloglu et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226944 A1 | 8/2013 | Baid et al. |
| 2013/0226953 A1 | 8/2013 | Markovich et al. |
| 2013/0231862 A1 | 9/2013 | Delling et al. |
| 2013/0232045 A1 | 9/2013 | Tai et al. |
| 2013/0232220 A1 | 9/2013 | Sampson |
| 2013/0238616 A1 | 9/2013 | Rose et al. |
| 2013/0238664 A1 | 9/2013 | Hsu et al. |
| 2013/0246170 A1 | 9/2013 | Gross et al. |
| 2013/0246537 A1 | 9/2013 | Gaddala |
| 2013/0246597 A1 | 9/2013 | Lizawa et al. |
| 2013/0251233 A1 | 9/2013 | Yang et al. |
| 2013/0262328 A1 | 10/2013 | Federgreen |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290161 A1 | 10/2013 | Aymeloglu et al. |
| 2013/0290825 A1 | 10/2013 | Arndt et al. |
| 2013/0293553 A1 | 11/2013 | Burr et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2013/0325826 A1 | 12/2013 | Agarwal et al. |
| 2014/0006404 A1 | 1/2014 | McGrew |
| 2014/0012724 A1 | 1/2014 | O'Leary et al. |
| 2014/0012796 A1 | 1/2014 | Petersen et al. |
| 2014/0012886 A1 | 1/2014 | Downing et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0074888 A1 | 3/2014 | Potter et al. |
| 2014/0081685 A1 | 3/2014 | Thacker et al. |
| 2014/0095273 A1 | 4/2014 | Tang et al. |
| 2014/0095363 A1 | 4/2014 | Caldwell |
| 2014/0095509 A1 | 4/2014 | Patton |
| 2014/0108068 A1 | 4/2014 | Williams |
| 2014/0108074 A1 | 4/2014 | Miller et al. |
| 2014/0108380 A1 | 4/2014 | Gotz et al. |
| 2014/0108985 A1 | 4/2014 | Scott et al. |
| 2014/0115589 A1 | 4/2014 | Marinelli, III et al. |
| 2014/0115610 A1 | 4/2014 | Marinelli, III et al. |
| 2014/0120864 A1 | 5/2014 | Manolarakis et al. |
| 2014/0123279 A1 | 5/2014 | Bishop et al. |
| 2014/0129261 A1 | 5/2014 | Bothwell et al. |
| 2014/0129936 A1 | 5/2014 | Richards |
| 2014/0136285 A1 | 5/2014 | Carvalho |
| 2014/0143009 A1 | 5/2014 | Brice et al. |
| 2014/0143025 A1 | 5/2014 | Fish |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0181833 A1 | 6/2014 | Bird et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0222521 A1 | 8/2014 | Chait |
| 2014/0222752 A1 | 8/2014 | Isman et al. |
| 2014/0222793 A1 | 8/2014 | Sadkin et al. |
| 2014/0229554 A1 | 8/2014 | Grunin et al. |
| 2014/0237354 A1 | 8/2014 | Burr et al. |
| 2014/0244388 A1 | 8/2014 | Manouchehri et al. |
| 2014/0267294 A1 | 9/2014 | Ma |
| 2014/0267295 A1 | 9/2014 | Sharma |

(56) References Cited

U.S. PATENT DOCUMENTS

| | | |
|---|---|---|
| 2014/0279824 A1 | 9/2014 | Tamayo |
| 2014/0279865 A1 | 9/2014 | Kumar |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0358789 A1 | 12/2014 | Boding et al. |
| 2014/0358829 A1 | 12/2014 | Hurwitz |
| 2014/0366132 A1 | 12/2014 | Stiansen et al. |
| 2015/0012509 A1 | 1/2015 | Kirn |
| 2015/0019394 A1 | 1/2015 | Unser et al. |
| 2015/0046481 A1 | 2/2015 | Elliot |
| 2015/0046870 A1 | 2/2015 | Goldenberg et al. |
| 2015/0073929 A1 | 3/2015 | Psota et al. |
| 2015/0073954 A1 | 3/2015 | Braff |
| 2015/0089424 A1 | 3/2015 | Duffield et al. |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0112641 A1 | 4/2015 | Faraj |
| 2015/0120176 A1 | 4/2015 | Curtis et al. |
| 2015/0134512 A1 | 5/2015 | Mueller |
| 2015/0134666 A1 | 5/2015 | Gattiker et al. |
| 2015/0135256 A1 | 5/2015 | Hoy et al. |
| 2015/0161611 A1 | 6/2015 | Duke et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178743 A1 | 6/2015 | Aymeloglu et al. |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0188872 A1 | 7/2015 | White |
| 2015/0205848 A1 | 7/2015 | Kumar et al. |
| 2015/0227295 A1 | 8/2015 | Meiklejohn et al. |
| 2015/0261817 A1 | 9/2015 | Harris et al. |
| 2015/0269030 A1 | 9/2015 | Fisher et al. |
| 2015/0309719 A1 | 10/2015 | Ma et al. |
| 2015/0310005 A1 | 10/2015 | Ryger et al. |
| 2015/0317342 A1 | 11/2015 | Grossman et al. |
| 2015/0324868 A1 | 11/2015 | Kaftan et al. |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0026923 A1 | 1/2016 | Erenrich et al. |
| 2016/0299652 A1 | 10/2016 | Aymeloglu |

FOREIGN PATENT DOCUMENTS

| | | |
|---|---|---|
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014213036 | 1/2015 |
| DE | 102014215621 | 2/2015 |
| EP | 0652513 | 5/1995 |
| EP | 1109116 | 6/2001 |
| EP | 1146649 | 10/2001 |
| EP | 1647908 | 4/2006 |
| EP | 1672527 | 6/2006 |
| EP | 1926074 | 5/2008 |
| EP | 2487610 | 8/2012 |
| EP | 2551799 | 1/2013 |
| EP | 2555126 | 2/2013 |
| EP | 2560134 | 2/2013 |
| EP | 2 634 745 | 9/2013 |
| EP | 2743839 | 6/2014 |
| EP | 2778913 | 9/2014 |
| EP | 2778914 | 9/2014 |
| EP | 2778974 | 9/2014 |
| EP | 2778977 | 9/2014 |
| EP | 2778986 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2876587 | 5/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2911078 | 8/2015 |
| EP | 2911100 | 8/2015 |
| EP | 2921975 | 9/2015 |
| EP | 2940603 | 11/2015 |
| EP | 2940609 | 11/2015 |
| EP | 2963595 | 1/2016 |
| GB | 2366498 | 3/2002 |
| GB | 2513472 | 10/2014 |
| GB | 2513721 | 11/2014 |
| GB | 2508503 | 1/2015 |
| GB | 2516155 | 1/2015 |
| GB | 2517582 | 2/2015 |
| GB | 2508293 | 4/2015 |
| GB | 2518745 | 4/2015 |
| HK | 1194178 | 9/2015 |
| NL | 2012778 | 11/2014 |
| NL | 2013134 | 1/2015 |
| NL | 2013306 | 2/2015 |
| NZ | 624557 | 12/2014 |
| NZ | 622485 | 3/2015 |
| NZ | 616212 | 5/2015 |
| NZ | 616299 | 7/2015 |
| WO | WO 2000/009529 | 2/2000 |
| WO | WO 2000/034895 | 6/2000 |
| WO | WO2001025906 | 4/2001 |
| WO | WO 2002/065353 | 8/2002 |
| WO | WO 2005/104736 | 11/2005 |
| WO | WO 2005/116851 | 12/2005 |
| WO | WO 2008/064207 | 5/2008 |
| WO | WO 2008/121499 | 10/2008 |
| WO | WO 2009/042548 | 4/2009 |
| WO | WO 2009/051987 | 4/2009 |
| WO | WO 2009/061501 | 5/2009 |
| WO | WO 2010/000014 | 1/2010 |
| WO | WO 2010/030913 | 3/2010 |
| WO | WO 2010/030914 | 3/2010 |
| WO | WO 2010/030915 | 3/2010 |
| WO | WO 2010/030917 | 3/2010 |
| WO | WO 2010/030919 | 3/2010 |
| WO | WO 2010/030946 | 3/2010 |
| WO | WO 2010/030949 | 3/2010 |
| WO | WO 2013/030595 | 3/2010 |
| WO | WO2010030914 | 3/2010 |
| WO | WO 2012/025915 | 3/2012 |
| WO | WO2012119008 | 9/2012 |
| WO | WO 2013/010157 | 1/2013 |
| WO | WO 2013/102892 | 7/2013 |

OTHER PUBLICATIONS

U.S. Appl. No. 14/265,637, filed Apr. 30, 2014, Notice of Allowance, dated Feb. 13, 2015.
U.S. Appl. No. 14/265,637, filed Apr. 30, 2014, First Office Action Interview Pilot Program, dated Sep. 26, 2014.
U.S. Appl. No. 13/218,238, filed Aug. 25, 2011, Notice of Allowance, dated Jan. 6, 2014.
U.S. Appl. No. 13/799,535, filed Mar. 13, 2013, Notice of Allowance, dated Jul. 29, 2014.
U.S. Appl. No. 13/218,238, filed Aug. 25, 2011, Supplemental Office Action, dated Oct. 25, 2013.

(56) References Cited

OTHER PUBLICATIONS

U.S. Appl. No. 13/218,238, filed Aug. 25, 2011, Interview Summary, dated Nov. 21, 2013.
U.S. Appl. No. 13/799,535, filed Mar. 13, 2013, Office Action, dated Feb. 3, 2014.
U.S. Appl. No. 13/218,238, filed Aug. 25, 2011, Office Action, dated Jul. 29, 2013.
U.S. Appl. No. 13/827,491, filed Mar. 14, 2013, Final Office Action, dated Jun. 22, 2015.
U.S. Appl. No. 14/571,098, filed Dec. 15, 2014, First Office Action Interview Pilot Program, dated Mar. 11, 2015.
U.S. Appl. No. 13/669,274, filed Nov. 5, 2012, Final Office Action, dated May 6, 2015.
Abbey, Kristen, "Review of Google Docs", dated May 1, 2007, 2 pages.
Bluttman et al., "Excel Formulas and Functions for Dummies", dated 2005, Wiley Publishing, Inc. pp. 280, 284-286.
Conner, Nancy, "Google Apps: The Missing Manual", dated May 1, 2008, p. 15.
Galliford, Miles, "SnagIt Versus Free Screen Capture Software: Critical Tools for Website Owners", http://www.subhub.com/articles/free-screen-capture-software>, dated Mar. 27, 2008, p. 11.
"GrabUp—What a Timesaver!", http://atlchris.com/191/grabup/>, dated Aug. 11, 2008, p. 3.
JetScreenshot.com, "Share Screenshots via Internet in Seconds", http://web.archive.org/web/20130807164204/http://www.jetscreenshot.com/, dated Aug. 7, 2013, 1 page.
Kwout, <http://web.archive.org/web/20080905132448/http://www.kwout.com/ dated Sep. 5, 2008, 2 pages.
Microsoft, "Registering an Application to a URI Scheme", http://msdn.microsoft.com/en-us/library/aa767914.aspx, printed Apr. 4, 2009, in 4 pages.
Microsoft, "Using the Clipoard", http://msdn.microsoft.com/en-us/libary/ms649016.aspx, printed Jun. 8, 2009, 20 pages.
SnagIt, "SnagIt 8.1.0 Print Out 2, "Software Release dated Jun. 15, 2006, 3 pages.
Nitro, Trick: How to Capture a Screenshot as PDF, Annotate, Then Share it, http://blog.nitropdf.com/2008/03/04/trick-how-to-capture-a-screenshot-as-pdf-annotate-it-then-share/>dated Apr. 2, 2008, 5 pages.
Online Tech Tips, "Clip2Net-Share files and Screenshots easily", http://www.online-tech-tips.com/free-software-downloads/share-files-folders-screenshots/>, dated Apr. 2, 2008, 5 pages.
O'Reilly.com, http://oreilly.com/digitalmedia/2006/01/01/mac-os-x-screenshot-secrets.html >published Jan. 1, 2006, 10 pages.
"Remove a Published Document or Blog Post", Sharing and Collaborating on Blog Post.
Schroder, Stan, "15 Ways to Create Website Screenshots", <http://mashable.com/2007/0824/web-screenshots/, dated Aug. 24, 2007, 2 pages.
SnagIt, "SnagIt Online Help Guide", http://download.techsmith.com/snagit/docs/onlinehelp/enu/snagit_help.pdf, TechSmith Corp., Version 8.1, printed Feb. 7, 2007, p. 284.
SnagIt, "SnagIt 8.1.0 Print Out", Software Release dated Jun. 15, 2006, p. 6.
Microsoft Windows, "Microsoft Windows Version 2002 Print Out 2", dated 2002, pp. 1-6.
Warren, Christina, "TUAW Faceoff: Screenshots apps on the firing line", http://www.tuaw.com/2008/05/05/tuaw-faceoff-screenshot-apps-on-the-firing-line/, dated May 5, 2008, p. 11.
"Frequently Asked Questions about Office Binder 97", http://web.archive.org/web2010112922/http://support.microsoft.com/kb/843147, printed Dec. 18, 2006, 5 pages.
Support.microsoft.com, "Frequently asked questions about Office Binder 97", 6 pages, printed from the internet Feb. 11, 2010, http://support.microsoft.com/kb/843147..
PCT/US2009/056707, International Search Report and Written Opinion, dated Mar. 2, 2010, 11 pages.
Adams et al., Worklets: A Service-Oriented Implementation of Dynamic Flexibility in Workflows, OTM dated 2006, LNCS, pp. 291-308.
Gu et al., "Record Linkage: Current Practice and Future Directions," Jan. 15, 2004, pp. 32.
Hua et al., "A Multi-attribute Data Structure with Parallel Bloom Filters for Network Services" HiPC 2006, LNCS 4297, pp. 277-288, 2006.
Official Communication for Great Britain Patent Application No. 1404486.1 dated Aug. 27, 2014.
Official Communication for Great Britain Patent Application No. 1404499.4 dated Aug. 20, 2014.
Official Communication for Great Britain Patent Application No. 1404489.5 dated Aug. 27, 2014.
Official Communication for New Zealand Patent Application No. 622473 dated Mar. 27, 2014.
Official Communication for New Zealand Patent Application No. 622473 dated Jun. 19, 2014.
Official Communication for New Zealand Patent Application No. 628161 dated Aug. 25, 2014.
U.S. Appl. No. 13/657,635, filed Oct. 22, 2012, Notice of Allowance, dated Jan. 29, 2016.
U.S. Appl. No. 13/767,779, filed Feb. 14, 2013, Notice of Allowance, dated Mar. 17, 2015.
U.S. Appl. No. 14/254,757, filed Apr. 16, 2014, Notice of Allowance, dated Sep. 10, 2014.
U.S. Appl. No. 14/254,773, filed Apr. 16, 2014, Notice of Allowance, dated Aug. 20, 2014.
U.S. Appl. No. 14/304,741, filed Jun. 13, 2014, Notice of Allowance, dated Apr. 7, 2015.
U.S. Appl. No. 14/581,902, filed Dec. 23, 2014, Notice of Allowance, dated Nov. 13, 2015.
U.S. Appl. No. 13/411,291, filed Mar. 2, 2012, Interview Summary, dated Oct. 1, 2015.
U.S. Appl. No. 13/827,627, filed Mar. 14, 2013, Final Office Action, dated Aug. 26, 2015.
U.S. Appl. No. 14/019,534, filed Sep. 5, 2013, Notice of Allowance, dated Jul. 20, 2015.
U.S. Appl. No. 14/019,534, filed Sep. 5, 2013, First Office Action Interview, dated Sep. 4, 2015.
U.S. Appl. No. 14/025,653, filed Sep. 12, 2013, First Office Action Interview, dated Oct. 6, 2015.
U.S. Appl. No. 13/827,627, filed Mar. 14, 2013, Interview Summary, dated Oct. 20, 2015.
U.S. Appl. No. 13/831,791, filed Mar. 15, 2013, Final Office Action, dated Aug. 6, 2015.
U.S. Appl. No. 14/134,558, filed Dec. 19, 2013, Office Action, dated Oct. 7, 2015.
U.S. Appl. No. 14/025,653, filed Sep. 12, 2013, Interview Summary, dated Mar. 3, 2016.
U.S. Appl. No. 13/608,864, filed Sep. 10, 2012, Office Action, dated Jun. 8, 2015.
U.S. Appl. No. 13/657,656, filed Oct. 22, 2012, Office Action, dated Oct. 7, 2014.
U.S. Appl. No. 13/657,656, filed Oct. 22, 2012, Final Office Action, dated May 6, 2015.
U.S. Appl. No. 13/608,864, filed Sep. 10, 2012, Office Action, dated Mar. 17, 2015.
U.S. Appl. No. 14/304,741, filed Jun. 13, 2014, Final Office Action, dated Mar. 3, 2015.
U.S. Appl. No. 14/304,741, filed Jun. 13, 2014, Office Action, dated Aug. 6, 2014.
U.S. Appl. No. 13/827,627, filed Mar. 14, 2013, Office Action, dated Mar. 2, 2015.
U.S. Appl. No. 13/827,627, filed Mar. 14, 2013, Office Action, dated Dec. 22, 2015.
U.S. Appl. No. 13/657,635, filed Oct. 22, 2012, Office Action, dated Mar. 30, 2015.
U.S. Appl. No. 13/657,635, filed Oct. 22, 2012, Final Office Action, dated Oct. 7, 2015.
U.S. Appl. No. 12/556,318, filed Sep. 9, 2009, Notice of Allowance, dated Nov. 2, 2015.

(56) References Cited

OTHER PUBLICATIONS

U.S. Appl. No. 13/196,788, filed Aug. 2, 2011, Notice of Allowance, dated Dec. 18, 2015.
U.S. Appl. No. 13/411,291, filed Mar. 2, 2012, Notice of Allowance, dated Apr. 22, 2016.
U.S. Appl. No. 13/657,656, filed Oct. 22, 2012, Notice of Allowance, dated May 10, 2016.
U.S. Appl. No. 13/826,228, filed Mar. 14, 2013, Notice of Allowance, dated Mar. 27, 2015.
U.S. Appl. No. 13/827,627, filed Mar. 14, 2013, Notice of Allowance, dated Apr. 11, 2016.
U.S. Appl. No. 13/922,212, filed Jun. 19, 2013, Notice of Allowance, dated Mar. 9, 2016.
U.S. Appl. No. 14/019,534, filed Sep. 5, 2013, Notice of Allowance, dated Feb. 4, 2016.
U.S. Appl. No. 14/102,394, filed Dec. 10, 2013, Notice of Allowance, dated Aug. 25, 2014.
U.S. Appl. No. 14/108,187, filed Dec. 16, 2013, Notice of Allowance, dated Aug. 29, 2014.
U.S. Appl. No. 14/135,289, filed Dec. 19, 2013, Notice of Allowance, dated Oct. 14, 2014.
U.S. Appl. No. 14/148,568, filed Jan. 6, 2014, Notice of Allowance, dated Aug. 26, 2015.
U.S. Appl. No. 14/192,767, filed Feb. 27, 2014, Notice of Allowance, dated Dec. 16, 2014.
U.S. Appl. No. 14/225,084, filed Mar. 25, 2014, Notice of Allowance, dated May 4, 2015.
U.S. Appl. No. 14/294,098, filed Jun. 2, 2014, Notice of Allowance, dated Dec. 29, 2014.
U.S. Appl. No. 14/323,935, filed Jul. 30, 2014, Notice of Allowance, dated Oct. 1, 2015.
U.S. Appl. No. 14/326,738, filed Jul. 9, 2014, Notice of Allowance, dated Nov. 18, 2015.
U.S. Appl. No. 14/473,552, filed Aug. 29, 2014, Notice of Allowance, dated Jul. 24, 2015.
U.S. Appl. No. 14/473,860, filed Aug. 29, 2014, Notice of Allowance, dated Jan. 5, 2015.
U.S. Appl. No. 14/486,991, filed Sep. 15, 2014, Notice of Allowance, dated May 1, 2015.
U.S. Appl. No. 14/616,080, filed Feb. 6, 2015, Notice of Allowance, dated Apr. 2, 2015.
U.S. Appl. No. 14/149,608, filed Jan. 7, 2014, Notice of Allowance, dated Aug. 5, 2014.
U.S. Appl. No. 14/302,279, filed Jun. 11, 2014, Notice of Allowance, dated Apr. 5, 2016.
U.S. Appl. No. 14/319,161, filed Jun. 30, 2014, Notice of Allowance, dated May 4, 2015.
U.S. Appl. No. 14/479,863, filed Sep. 8, 2014, Notice of Allowance, dated Mar. 31, 2015.
U.S. Appl. No. 14/504,103, filed Oct. 1, 2014, Notice of Allowance, dated May 18, 2015.
U.S. Appl. No. 14/552,336, filed Nov. 24, 2014, Notice of Allowance, dated Nov. 3, 2015.
U.S. Appl. No. 14/746,671, filed Jun. 22, 2015, Notice of Allowance, dated Jan. 21, 2016.
U.S. Appl. No. 14/923,364, filed Oct. 26, 2015, Notice of Allowance, dated May 6, 2016.
U.S. Appl. No. 15/066,970, filed Mar. 10, 2016, Notice of Allowance, dated Jan. 29, 2016.
U.S. Appl. No. 14/148,568, filed Jan. 6, 2014, Office Action, dated Mar. 26, 2015.
U.S. Appl. No. 14/289,596, filed May 28, 2014, Advisory Action, dated Apr. 30, 2015.
U.S. Appl. No. 13/922,212, filed Jun. 19, 2013, Final Office Action, dated Jan. 5, 2015.
U.S. Appl. No. 14/816,599, filed Aug. 3, 2015, Office Action, dated Dec. 22, 2016.
U.S. Appl. No. 12/210,947, filed Sep. 15, 2008, Office Action, dated Jul. 1, 2013.
U.S. Appl. No. 12/210,947, filed Sep. 15, 2008, Final Office Action, dated Aug. 19, 2014.
U.S. Appl. No. 12/210,947, filed Sep. 15, 2008, Advisory Action, dated Nov. 28, 2014.
U.S. Appl. No. 12/210,947, filed Sep. 15, 2008, Office Action, dated Apr. 8, 2011.
U.S. Appl. No. 12/210,980, filed Sep. 15, 2008, Office Action, dated Mar. 10, 2015.
U.S. Appl. No. 12/556,318, filed Jun. 16, 2014, Office Action, dated Jul. 2, 2015.
U.S. Appl. No. 13/079,690, filed Apr. 4, 2011, Office Action, dated Sep. 11, 2013.
U.S. Appl. No. 13/079,690, filed Apr. 4, 2011, Final Offic Action, dated Jan. 29, 2014.
U.S. Appl. No. 13/079,690, filed Apr. 4, 2011, Office Action, dated Mar. 5, 2015.
U.S. Appl. No. 13/196,788, filed Aug. 2, 2011, Office Action, dated Oct. 23, 2015.
U.S. Appl. No. 13/196,788, filed Aug. 2, 2011, Interview Summary, dated Nov. 25, 2015.
U.S. Appl. No. 13/247,987, filed Sep. 28, 2011, Office Action, dated Apr. 2, 2015.
U.S. Appl. No. 13/247,987, filed Sep. 28, 2011, Office Action, dated Sep. 22, 2015.
U.S. Appl. No. 13/657,635, filed Oct. 22, 2012, Final Office Action, dated Jul. 10, 2014.
U.S. Appl. No. 13/728,879, filed Dec. 27, 2012, First Office Action Interview, dated Mar. 17, 2015.
U.S. Appl. No. 13/827,491, filed Mar. 14, 2013, Office Action, dated Dec. 1, 2014.
U.S. Appl. No. 13/827,491, filed Mar. 14, 2013, Office Action, dated Mar. 30, 2016.
U.S. Appl. No. 13/827,491, filed Mar. 14, 2013, Office Action, dated Oct. 9, 2015.
U.S. Appl. No. 13/835,688, filed Mar. 15, 2013, First Office Action Interview, dated Jun. 17, 2015.
U.S. Appl. No. 14/225,160, filed Mar. 25, 2014, Final Office Action, dated Feb. 11, 2015.
U.S. Appl. No. 14/225,160, filed Mar. 25, 2014, Office Action, dated Aug. 12, 2015.
U.S. Appl. No. 14/225,160, filed Mar. 25, 2014, Advisory Action, dated May 20, 2015.
U.S. Appl. No. 14/225,160, filed Mar. 25, 2014, First Office Action Interview, dated Oct. 22, 2014.
U.S. Appl. No. 14/225,160, filed Mar. 25, 2014, First Office Action Interview, dated Jul. 29, 2014.
U.S. Appl. No. 14/225,084, filed Mar. 25, 2014, First Office Action Interview, dated Sep. 2, 2014.
U.S. Appl. No. 14/225,084, filed Mar. 25, 2014, Interview Summary, dated Jan. 4, 2016.
U.S. Appl. No. 14/225,084, filed Mar. 25, 2014, First Office Action Interview, dated Feb. 20, 2015.
U.S. Appl. No. 14/225,084, filed Mar. 25, 2014, Office Action, dated Sep. 11, 2015.
U.S. Appl. No. 14/225,006, filed Mar. 25, 2014, First Office Action Interview, dated Sep. 10, 2014.
U.S. Appl. No. 14/225,006, filed Mar. 25, 2014, First Office Action Interview, dated Feb. 27, 2015.
U.S. Appl. No. 14/225,006, filed Mar. 25, 2014, Advisory Action, dated Dec. 21, 2015.
U.S. Appl. No. 14/225,006, filed Mar. 25, 2014, Final Office Action, dated Sep. 2, 2015.
U.S. Appl. No. 14/319,161, filed Jun. 30, 2014, Final Office Action, dated Jan. 23, 2015.
U.S. Appl. No. 14/451,221, filed Aug. 4, 2014, Office Action, dated Oct. 21, 2014.
U.S. Appl. No. 14/463,615, filed Aug. 19, 2014, First Office Action Interview, dated Nov. 13, 2014.
U.S. Appl. No. 14/463,615, filed Aug. 19, 2014, Final Office Action, dated May 21, 2015.
U.S. Appl. No. 14/463,615, filed Aug. 19, 2014, First Office Action Interview, dated Jan. 28, 2015.

(56) References Cited

OTHER PUBLICATIONS

U.S. Appl. No. 14/306,147, filed Jun. 16, 2014, First Office Action Interview, dated Sep. 9, 2014.
U.S. Appl. No. 14/306,138, filed Jun. 16, 2014, First Office Action Interview, dated Sep. 23, 2015.
U.S. Appl. No. 14/306,138, filed Jun. 16, 2014, Interview Summary, dated Dec. 3, 2015.
U.S. Appl. No. 14/306,138, filed Jun. 16, 2014, Interview Summary, dated Dec. 24, 2015.
U.S. Appl. No. 14/306,138, filed Jun. 16, 2014, Office Action, dated May 26, 2015.
U.S. Appl. No. 14/306,138, filed Jun. 16, 2014, Final Office Action, dated Sep. 14, 2015.
U.S. Appl. No. 14/306,138, filed Jun. 16, 2014, Final Office Action, dated Feb. 18, 2015.
U.S. Appl. No. 14/196,814, filed Mar. 4, 2014, Office Action, dated May 5, 2015.
U.S. Appl. No. 13/839,026, filed Mar. 15, 2013, Office Action, dated Aug. 4, 2015.
U.S. Appl. No. 13/937,063, filed Jul. 8, 2013, First Office Action Interview, dated Apr. 22, 2016.
U.S. Appl. No. 14/134,558, filed Dec. 19, 2013, Final Office Action, dated May 16, 2016.
U.S. Appl. No. 14/141,252, filed Dec. 26, 2013, Office Action, dated Oct. 8, 2015.
U.S. Appl. No. 14/148,568, filed Jan. 6, 2014, Final Office Action, dated Oct. 22, 2014.
U.S. Appl. No. 14/268,964, filed May 2, 2014, First Office Action Interview, dated Sep. 3, 2014.
U.S. Appl. No. 14/289,596, filed May 28, 2014, First Office Action Interview, dated Jul. 18, 2014.
U.S. Appl. No. 14/289,596, filed May 28, 2014, Final Office Action, dated Jan. 26, 2015.
U.S. Appl. No. 14/289,599, filed May 28, 2014, First Office Action Interview, dated Jul. 22, 2014.
U.S. Appl. No. 14/289,599, filed May 28, 2014, Final Office Action, dated May 29, 2015.
U.S. Appl. No. 14/289,599, filed May 28, 2014, Advisory Action, dated Sep. 4, 2015.
U.S. Appl. No. 14/294,098, filed Jun. 2, 2014, Final Office Action, dated Nov. 6, 2014.
U.S. Appl. No. 14/294,098, filed Jun. 2, 2014, First Office Action Interview, dated Aug. 15, 2014.
U.S. Appl. No. 14/306,147, filed Jun. 16, 2014, Final Office Action, dated Feb. 19, 2015.
U.S. Appl. No. 14/306,147, filed Jun. 16, 2014, Office Action, dated Aug. 7, 2015.
U.S. Appl. No. 14/306,147, filed Jun. 16, 2014, Final Office Action, dated Dec. 24, 2015.
U.S. Appl. No. 14/306,154, filed Jun. 16, 2014, Advisory Action, dated May 15, 2015.
U.S. Appl. No. 14/306,154, filed Jun. 16, 2014, Final Office Action, dated Mar. 11, 2015.
U.S. Appl. No. 14/306,154, filed Jun. 16, 2014, First Office Action Interview, dated Sep. 9, 2014.
U.S. Appl. No. 14/306,154, filed Jun. 16, 2014, Final Office Action, dated Nov. 16, 2015.
U.S. Appl. No. 14/306,154, filed Jun. 16, 2014, Office Action, dated Jul. 6, 2015.
U.S. Appl. No. 14/319,765, filed Jun. 30, 2014, Advisory Action, dated Sep. 10, 2015.
U.S. Appl. No. 14/319,765, filed Jun. 30, 2014, Final Office Action, dated Jun. 16, 2015.
U.S. Appl. No. 14/319,765, filed Jun. 30, 2014, First Office Action Interview, dated Feb. 4, 2015.
U.S. Appl. No. 14/319,765, filed Jun. 30, 2014, Notice of Allowance, dated Nov. 25, 2014.
U.S. Appl. No. 14/323,935, filed Jul. 3, 2014, First Office Action Interview, dated Mar. 31, 2015.
U.S. Appl. No. 14/323,935, filed Jul. 3, 2014, First Office Action Interview, dated Nov. 28, 2014.
U.S. Appl. No. 14/323,935, filed Jul. 3, 2014, Office Action, dated Jun. 22, 2015.
U.S. Appl. No. 14/326,738, filed Jul. 9, 2014, First Office Action Interview, dated Jul. 31, 2015.
U.S. Appl. No. 14/326,738, filed Jul. 9, 2014, First Office Action Interview, dated Dec. 2, 2014.
U.S. Appl. No. 14/463,615, filed Aug. 19, 2014, Office Action, dated Dec. 9, 2015.
U.S. Appl. No. 14/483,527, filed Sep. 11, 204, First Office Action Interview, dated Jan. 28, 2015.
U.S. Appl. No. 14/504,103, filed Oct. 1, 2014, First Office Action Interview, dated Mar. 31, 2015.
U.S. Appl. No. 14/552,336, filed Nov. 24, 2014, First Office Action Interview, dated Jul. 20, 2015.
U.S. Appl. No. 14/571,098, filed Dec. 15, 2014, First Office Action Interview, dated Aug. 24, 2015.
U.S. Appl. No. 14/571,098, filed Dec. 15, 2014, First Office Action Interview, dated Nov. 10, 2015.
U.S. Appl. No. 14/571,098, filed Dec. 15, 2014, First Office Action Interview, dated Aug. 5, 2015.
U.S. Appl. No. 14/562,524, filed Dec. 5, 2014, First Office Action Interview, dated Nov. 10, 2015.
U.S. Appl. No. 14/562,524, filed Dec. 5, 2014, First Office Action Interview, dated Sep. 14, 2015.
U.S. Appl. No. 14/302,279, filed Jun. 11, 2014, Office Action, dated Sep. 24, 2015.
U.S. Appl. No. 14/473,552, filed Aug. 29, 2014, Interview Summary, dated Feb. 24, 2015.
U.S. Appl. No. 14/490,612, filed Sep. 18, 2014, Final Office Action, dated Aug. 18, 2015.
U.S. Appl. No. 14/479,863, filed Sep. 8, 2014, First Office Action Interview, dated Dec. 26, 2014.
U.S. Appl. No. 14/800,447, filed Jul. 15, 2012, First Office Action Interview, dated Dec. 10, 2010.
U.S. Appl. No. 14/483,527, filed Sep. 11, 2014, Final Office Action, dated Jun. 22, 2015.
U.S. Appl. No. 14/486,991, filed Sep. 15, 2014, Office Action, dated Mar. 10, 2015.
U.S. Appl. No. 14/516,386, filed Oct. 16, 2014, Final Office Action, dated Nov. 4, 2016.
U.S. Appl. No. 14/516,386, filed Oct. 16, 2014, First Office Action Interview, dated Feb. 24, 2016.
U.S. Appl. No. 14/516,386, filed Oct. 16, 2014, First Office Action Interview, dated Jun. 30, 2016.
U.S. Appl. No. 14/562,524, filed Dec. 5, 2014, Final Office Action, dated Feb. 18, 2016.
U.S. Appl. No. 14/676,621, filed Apr. 1, 2015, Final Office Action, dated Oct. 29, 2015.
U.S. Appl. No. 14/639,606, filed Mar. 5, 2015, First Office Action Interview, dated May 18, 2015.
U.S. Appl. No. 14/639,606, filed Mar. 5, 2015, First Office Action Interview, dated Jul. 24, 2015.
U.S. Appl. No. 14/579,752, filed Dec. 22, 2014, Final Office Action, dated Aug. 19, 2015.
U.S. Appl. No. 14/579,752, filed Dec. 22, 2014, First Office Action Interview, dated May 26, 2015.
U.S. Appl. No. 14/631,633, filed Feb. 25, 2015, First Office Action Interview, dated Sep. 10, 2015.
U.S. Appl. No. 14/639,606, filed Mar. 5, 2015, Final Office Action, dated Oct. 16, 2015.
U.S. Appl. No. 14/676,621, filed Apr. 1, 2015, First Office Action Interview, dated Jul. 30, 2015.
U.S. Appl. No. 14/726,211, filed May 29, 2015, Office Action, dated Feb. 5, 2016.
U.S. Appl. No. 14/726,353, filed May 29, 2015, First Office Action Interview, dated Sep. 10, 2015.
U.S. Appl. No. 14/813,749, filed Jul. 30, 2015, Office Action, dated Sep. 28, 2015.
U.S. Appl. No. 14/842,734, filed Sep. 1, 2015, First Office Action Interview, dated Nov. 19, 2015.

(56) References Cited

OTHER PUBLICATIONS

U.S. Appl. No. 14/877,229, filed Oct. 7, 2015, Office Action, dated Mar. 22, 2016.
U.S. Appl. No. 14/923,374, filed Oct. 26, 2015, First Office Action Interview, dated May 23, 2016.
U.S. Appl. No. 14/923,374, filed Oct. 26, 2015, First Office Action Interview, dated Feb. 9, 2016.
U.S. Appl. No. 15/017,324, filed Feb. 5, 2016, First Office Action Interview, dated Apr. 22, 2016.
U.S. Appl. No. 13/839,026, filed Mar. 15, 2013, Restriction Requirement, dated Apr. 2, 2015.
U.S. Appl. No. 14/726,211, filed May 29, 2015, Office Action, datad Apr. 5, 2016.
U.S. Appl. No. 14/504,103, filed Oct. 1, 2014, First Office Action Interview, dated Feb. 5, 2015.
U.S. Appl. No. 12/556,321, filed Sep. 9, 2009, Final Office Action, dated Oct. 6, 2016.
U.S. Appl. No. 12/556,321, filed Sep. 9, 2009, Final Office Action, dated Feb. 25, 2016.
U.S. Appl. No. 12/556,321, filed Sep. 9, 2009, Office Action, dated Jul. 7, 2015.
U.S. Appl. No. 14/326,738, filed Jul. 9, 2014, First Office Action Interview, dated Mar. 31, 2015.
U.S. Appl. No. 14/268,964, filed May 2, 2014, Notice of Allowance, dated Dec. 3, 2014.
Wahl, Jim, "How to Create a Small Multiple Masterpiece in Tableau", dated Nov. 10, 2014, 22 pages.
U.S. Appl. No. 14/516,386, filed Oct. 16, 2014, Office Action, dated Apr. 27, 2017.
U.S. Appl. No. 14/618,213, filed Feb. 10, 2015, Office Action, dated May 16, 2017.
U.S. Appl. No. 14/816,599, filed Aug. 3, 2015, Final Office Action, dated May 31, 2017.
"A Tour of Pinboard," <http://pinboard.In/tour> as printed May 15, 2014 in 6 pages.
"The FASTA Program Package," fasta-36.3.4, Mar. 25, 2011, pp. 29.
Alur et al., "Chapter 2: IBM InfoSphere DataStage Stages," IBM InfoSphere DataStage Data Flow and Job Design, Jul. 1, 2008, pp. 35-137.
Bae et al., "Partitioning Algorithms for the Computation of Average Iceberg Queries," DaWaK 2000, LNCS 1874, pp. 276_286.
Ballesteros et al., "Batching: A Design Pattern for Efficient and Flexible Client/Server Interaction," Transactions on Pattern Languages of Programming, Springer Berlin Heildeberg, 2009, pp. 48-66.
Bogle, Phillip Lee, "Reducing Cross-Domain Call Overhead Using Batched Futures," May 1994, Massachusetts Institute of Technology, pp. 96.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.
Canese et al., "Chapter 2: PubMed: The Bibliographic Database," The NCBI Handbook, Oct. 2002, pp. 1-10.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Delcher et al., "Identifying Bacterial Genes and Endosymbiont DNA with Glimmer," BioInformatics, vol. 23, No. 6, 2007, pp. 673-679.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference New York, 1998, pp. 299-310.
Goldstein et al., "Stacks Lazy Threads: Implementing a Fast Parallel Call," Journal of Parallel and Distributed Computing, 1 Jan. 1996, pp. 5-20.
Han et al., "Efficient Computation of Iceberg Cubes with Complex Measures," ACM Sigmod, May 21-24, 2001, pp. 1-12.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51₯ 55.
Kitts, Paul, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: Gen Bank: The Nuckeotide Sequence Database," The NCBI Handbook, Oct. 2002, pp. 1-14.
Notice of Acceptance for New Zealand Patent Application No. 616212 dated Jan. 23, 2015.
Notice of Acceptance for New Zealand Patent Application No. 616299 dated Apr. 7, 2015.
Notice of Acceptance for New Zealand Patent Application No. 622485 dated Nov. 24, 2014.
Official Communication for Australian Patent Application No. 2013237658 dated Feb. 2, 2015.
Official Communication for Australian Patent Application No. 2013237710 dated Jan. 16, 2015.
Official Communication for Australian Patent Application No. 2014201580 dated Feb. 27, 2015.
Official Communication for Canadian Patent Application No. 2807899 dated Jul. 20, 2015.
Official Communication for Canadian Patent Application No. 2807899 dated Oct. 24, 2014.
Official Communication for Canadian Patent Application No. 2828264 dated Apr. 28, 2015.
Official Communication for Canadian Patent Application No. 2829266 dated Apr. 28, 2015.
Official Communication for European Patent Application No. 13157474.1 dated Oct. 30, 2015.
Official Communication for European Patent Application No. 14159175.0 dated Jul. 17, 2014.
Official Communication for European Patent Application No. 14159175.0 dated Feb. 4, 2016.
Official Communication for European Patent Application No. 14159629.6 dated Sep. 22, 2014.
Official Communication for European Patent Application No. 14159629.6 dated Jul. 31, 2014.
Official Communication for European Patent Application No. 15159520.4 dated Jul. 15, 2015.
Official Communication for German Patent Application No. 10 2013 221 052.3 dated Mar. 24, 2015.
Official Communication for German Patent Application No. 10 2013 221 057.4 dated Mar. 23, 2015.
Russell et al., "Nitelight: A Graphical Tool for Semantic Query Construction," 2008, pp. 10.

(56) References Cited

OTHER PUBLICATIONS

Sirotkin et al., "Chapter 13: The Processing of Biological Sequence Data at NCBI," The NCBI Handbook, Oct. 2002, pp. 1-11.
Official Communication for Great Britain Patent Application No. 1404574.4 dated Dec. 18, 2014.
Official Communication for Netherlands Patent Application No. 2011613 dated Aug. 13, 2015.
Official Communication for Netherlands Patent Application No. 2011627 dated Aug. 14, 2015.
Official Communication for Netherlands Patent Application No. 2012437 dated Sep. 18, 2015.
Official Communication for New Zealand Patent Application No. 616299 dated Jan. 26, 2015.
Official Communication for New Zealand Patent Application No. 622414 dated Mar. 24, 2014.
Official Communication for New Zealand Patent Application No. 622484 dated Apr. 2, 2014.
Official Communication for New Zealand Patent Application No. 622485 dated Nov. 21, 2014.
Smart et al., "A Visual Approach to Semantic Query Design Using a Web-Based Graphical Query Designer," 16th International Conference on Knowledge Engineering and Knowledge Management (EKAW 2008),ÊAcitrezza, Catania, Italy, Sep.Ê29-Oct. 3, 2008, pp. 16.
Stamos et al., "Remote Evaluation," Journal ACM Transactions on Programming Languages and Systems (TOPLAS) vol. 12, Issue 4, Oct. 1990, pp. 537-564.
Wikipedia, "Machine Code", p. 1-5, printed Aug. 11, 2014.
Wollrath et al., "A Distributed Object Model for the Java System," Proceedings of the 2nd Conference on USENEX, Conference on Object-Oriented Technologies (COOTS), Jun. 17, 1996, pp. 219-231.
"A First Look: Predicting Market Demand for Food Retail using a Huff Analysis," TRF Policy Solutions, Jul. 2012, pp. 30.
"A Quick Guide to UniProtKB Swiss-Prot & TrEMBL," Sep. 2011, pp. 2.
"A Word About Banks and the Laundering of Drug Money," Aug. 18, 2012, http://www.golemxiv.co.uk/2012/08/a-word-about-banks-and-the-laundering-of-drug-money/.
"E-Mail Relay," <http://web.archive.org/web/20080821175021/http://emailrelay.sourceforge.net/>.
"How to Create a small Multiple Masterpiece in Tableau," Nov. 10, 2014.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
"Money Laundering Risks and E-Gaming: A European Overview and Assessment," 2009, http://www.cf.ac.uk/socsi/resources/Levi_Final_Money_Laudering_Risks_egaming.pdf.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
"Using Whois Based Geolocation and Google Maps API for Support Cybercrime Investigations," http://wseas.us/e-library/conferences/2013/Dubrovnik/TELECIRC/TELECIRC-32.pdf.
About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.
Acklen, Laura, "Absolute Beginner's Guide to Microsoft Word 2003," Dec. 24, 2003, pp. 15-18, 34-41, 308-316.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Anonymous, "A Real-World Problem of Matching Records," Nov. 2006, <http://grupoweb.upf.es/bd-web/slides/ullman.pdf> pp. 1-16.
Appacts, "Smart Thinking for Super Apps," <http://www.appacts.com> Printed Jul. 18, 2013 in 4 pages.
Apsalar, "Data Powered Mobile Advertising," "Free Mobile App Analytics" and various analytics related screen shots <http://apsalar.com> Printed Jul. 18, 2013 in 8 pages.
Ashraf, "Protect your Google Account (Gmail) by enabling SMS (text message) notifications for Suspicious Activity," online article from dotTech, Jan. 24, 2013, https://dottech.org/94405/how-to-setup-text-message-sms-google-notifications-for-suspicious-activity/.
Bradbard, Matthew, "Technical Analysis Applied," <http://partners.futuresource.com/fastbreak/2007/0905.htm>, Sep. 5, 2007, pp. 6.
Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.
Breierova et al., "An Introduction to Sensitivity Analysis," Publsihed by Massachusetts Institute of Technology, Cambridge, MA, Oct. 2001, pp. 67.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Capptain—Pilot Your Apps, <http://www.capptain.com> Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117Mresizing-amp-overflow retrieved on May 18, 2015.
Chaudhuri et al., "An Overview of Business Intelligence Technology," Communications of the ACM, Aug. 2011, vol. 54, No. 8.
Chen et al., "A Novel Emergency Vehicle Dispatching System," 2013 IEEE 77th Vehicular Technology Conference, IEEE, Jun. 2, 2013, 5 pages.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Cohn, et al., "Semi-supervised clustering with user feedback," Constrained Clustering: Advances in Algorithms, Theory, and Applications 4.1 (2003): 17-32.
Countly Mobile Analytics, <http://count.ly/> Printed Jul. 18, 2013 in 9 pages.
Definition "Identify", downloaded Jan. 22, 2015, 1 page.
Definition "Overlay", downloaded Jan. 22, 2015, 1 page.
Delicious, <http://delicious.com/> as printed May 15, 2014 in 1 page.
Devanbu et al., "Authentic Third-party Data Publication," 2000, pp. 19, http://www.cs.ucdavis.edu/~devanbu/authdbpub.pdf.
Distimo—App Analytics, <http://www.distimo.com/app-analytics> Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Dreyer et al., "An Object-Oriented Data Model for a Time Series Management System," Proceedings of the 7th International Working Conference on Scientific and Statistical Database Management, Charlottesville, Virginia USA, Sep. 28-30, 1994, pp. 12.

(56) References Cited

OTHER PUBLICATIONS

Eklund et al., "A Dynamic Multi-source Dijkstra's Algorithm for Vehicle Routing," Intelligent Information Systems, 1996, pp. 329-333.
Fischer et al., "Populating a Release History Database From Version Control and Bug Tracking Systems," Software Maintenance, 2003, ICSM 2003, Proceedings International Conference, pp. 1-10.
Flurry Analytics, <http://www.flurry.com/> Printed Jul. 18, 2013 in 14 pages.
Frantisek et al., "An Architectural View of Distributed Objects and Components in Corba, Java RMI and COM/DCOM," Software—Concepts & Tools, vol. 19, No. 1, Jun. 1, 1998, pp. 14-28.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
GIS-NET 3 Public_Department of Regional Planning. Planning & Zoning Information for Unincorporated LA County. Retrieved Oct. 2, 2013 from http://gis.planning.lacounty.gov/GIS-NET3_Public/Viewer.html.
Hibbert et al., "Prediction of Shopping Behavior Using a Huff Model Within a GIS Framework," Healthy Eating in Context, Mar. 18, 2011, pp. 16.
Jotshi et al., "Dispatching and Routing of Emergency Vehicles in Disaster Mitigation Using Data Fusion." Socio-Economic Planning Sciences, Pergamon, Amsterdam, Netherlands, vol. 43, No. 1, Mar. 1, 2009, 24 pages.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threatstpdf> downloaded May 12, 2014 in 10 pages.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al., "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hart et al., "A Formal Basis for the Heuristic Determination of Minimum Cost Paths," IEEE Transactions on Systems Science and Cybernetics, IEEE, vol. 1, No. 2, Jul. 1, 1968, pp. 100-107.
Kontagent Mobile Analytics, <http://www.kontagent.com/> Printed Jul. 18, 2013 in 9 pages.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
International Search Report and Written Opinion for Patent Application No. PCT/US2008/056439 dated Jun. 8, 2009.
International Search Report and Written Opinion for Patent Application No. PCT/US2008/077244 dated Nov. 28, 2008.
International Search Report and Written Opinion for Patent Application No. PCT/US2009/056705 dated Mar. 26, 2010.
International Search Report and Written Opinion for Patent Application No. PCT/US2009/056738 dated Mar. 29, 2010.
International Search Report and Written Opinion for Patent Application No. PCT/US2009/056742 dated Apr. 19, 2010.
International Search Report and Written Opinion in Application No. PCT/US2009/056703, dated Mar. 15, 2010.
Johnson, Maggie, "Introduction to YACC and Bison".
Johnson, Steve, "Access 2013 on demand," Access 2013 on Demand, May 9, 2013, Que Publishing.
Li et al., "Interactive Multimodal Visual Search on Mobile Device," IEEE Transactions on Multimedia, vol. 15, No. 3, Apr. 1, 2013, pp. 594-607.
Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.
Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.
Liu, Tianshun, "Combining Gis and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map Builder, "Rapid Mashup Development Tool for Google and Yahoo Maps!" <http://web.archive.org/web/20090626224734/http://www.mapbuildernet/> printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.
Mitzenmacher, Michael, "Compressed Bloom Filters," IEEE/ACM Tranactions on Networking, vol. 10, No. 5, Oct. 2002, pp. 604-612.
Mixpanel—Mobile Analytics, <https://mixpanel.com/> Printed Jul. 18, 2013 in 13 pages.
Mohring et al., "Partitioning Graphs to Speedup Dijkstra's Algorithm," ACM Journal of Experimental Algorithmics, Association of Computing Machinery, New York, New York, vol. 11, Jan. 1, 2006, 29 pages.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-usivisio-help/add-and-glue-connectors-with-the-connector-tool-HA010048532.aspx?CTT=1> printed Aug. 4, 2011 in 1 page.
Notice of Acceptance for Australian Patent Application No. 2014250678 dated Oct. 7, 2015.
Nadeau et al., "A Survey of Named Entity Recognition and Classification," Jan. 15, 2004, pp. 20.

(56) References Cited

OTHER PUBLICATIONS

Nierman, "Evaluating Structural Similarity in XML Documents", 6 pages, 2002.
Nin et al., "On the Use of Semantic Blocking Techniques for Data Cleansing and Integration," 11th International Database Engineering and Applications Symposium, 2007, pp. 9.
Nolan et al., "MCARTA: A Malicious Code Automated Run-Time Analysis Framework," Homeland Security (HST) 2012 IEEE Conference on Technologies for, Nov. 13, 2012, pp. 13-17.
Official Communication for Australian Patent Application No. 2014202442 dated Mar. 19, 2015.
Official Communication for Australian Patent Application No. 2014201506 dated Feb. 27, 2015.
Official Communication for Great Britain Patent Application No. 1411984.6 dated Dec. 22, 2014.
Official Communication for Australian Patent Application No. 2014201507 dated Feb. 27, 2015.
Official Communication for Australian Patent Application No. 2014201511 dated Feb. 27, 2015.
Official Communication for Australian Patent Application No. 2014213553 dated May 7, 2015.
Official Communication for Australian Patent Application No. 2014203669 dated May 29, 2015.
Official Communication for Australian Patent Application No. 2014210604 dated Jun. 5, 2015.
Official Communication for Australian Patent Application No. 2014250678 dated Jun. 17, 2015.
Official Communication for Canadian Patent Application No. 2828264 dated Apr. 11, 2016.
Official Communication for Canadian Patent Application No. 2829266 dated Apr. 1, 2016.
Official Communication for Canadian Patent Application No. 2846414 dated Apr. 13, 2016.
Official Communication for European Application No. 14159418.4 dated Oct. 8, 2014.
Official Communication for European Patent Application No. 08730336.8 dated Jun. 6, 2012.
Official Communication for European Patent Application No. 08839003.4 dated Aug. 14, 2012.
Official Communication for European Patent Application No. 13157474.1 dated May 28, 2013.
Official Communication for European Patent Application No. 13157474.1 dated Apr. 29, 2016.
Official Communication for European Patent Application No. 14158861.6 dated Jun. 16, 2014.
Official Communication for European Patent Application No. 14158958.0 dated Apr. 16, 2015.
Official Communication for European Patent Application No. 14158958.0 dated Jun. 3, 2014.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14158977.0 dated Jun. 10, 2014.
Official Communication for European Patent Application No. 14158977.0 dated Apr. 16, 2015.
Official Communication for European Patent Application No. 14159464.8 dated Feb. 18, 2016.
Official Communication for European Patent Application No. 14159464.8 dated Jul. 31, 2014.
Official Communication for European Patent Application No. 14162372.8 dated Apr. 30, 2015.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application no. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 14200246.8 dated May 29, 2015.
Official Communication for European Patent Application No. 14200298.9 dated May 13, 2015.
Official Communication for European Patent Application No. 15155846.7 dated Jul. 8, 2015.
Official Communication for European Patent Application No. 15165244.3 dated Aug. 27, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15183721.8 dated Nov. 23, 2015.
Official Communication for European Patent Application No. 15181419.1 dated Sep. 29, 2015.
Official Communication for European Patent Application No. 15184764.7 dated Dec. 14, 2015.
Official Communication for Great Britain Application No. 1404457.2 dated Aug. 14, 2014.
Official Communication for Great Britain Patent Application No. 1318666.3 dated Mar. 25, 2014.
Official Communication for Great Britain Patent Application No. 1318667.1 dated Mar. 28, 2014.
Official Communication for Great Britain Patent Application No. 1404457.2 dated Aug. 14, 2014.
Official Communication for Great Britain Patent Application No. 1404486.1 dated May 21, 2015.
Official Communication for Great Britain Patent Application No. 1404489.5 dated May 21, 2015.
Official Communication for Great Britain Patent Application No. 1404499.4 dated Jun. 11, 2015.
Official Communication for Great Britain Patent Application No. 1408025.3 dated Nov. 6, 2014.
Official Communication for Great Britain Patent Application No. 1413935.6 dated Jan. 27, 2015.
Official Communication for Netherlands Patent Application No. 2012417 dated Sep. 18, 2015.
Official Communication for Netherlands Patent Application No. 2012421 dated Sep. 18, 2015.
Official Communication for New Zealand Patent Application No. 622404 dated Mar. 20, 2014.
Official Communication for New Zealand Patent Application No. 622439 dated Mar. 24, 2014.
Official Communication for New Zealand Patent Application No. 622439 dated Jun. 6, 2014.
Official Communication for New Zealand Patent Application No. 622513 dated Aug. 3, 2014.
Official Communication for New Zealand Patent Application No. 622517 dated Apr. 3, 2014.
Official Communication for Netherlands Patent Application No. 2012436 dated Nov. 6, 2015.

(56) References Cited

OTHER PUBLICATIONS

Official Communication for Netherlands Patent Application No. 2012438 dated Sep. 21, 2015.
Official Communication for Netherlands Patent Application No. 2013134 dated Apr. 20, 2015.
Official Communication for Netherlands Patent Application No. 2013306 dated Apr. 24, 2015.
Official Communication for New Zealand Patent Application No. 622389 dated Mar. 20, 2014.
Official Communication for New Zealand Patent Application No. 616212 dated May 7, 2014.
Official Communication for New Zealand Patent Application No. 616212 dated Oct. 9, 2013.
Official Communication for New Zealand Patent Application No. 623323 dated Apr. 17, 2014.
Official Communication for New Zealand Patent Application No. 627962 dated Aug. 5, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication in New Zealand Application No. 628840 dated Aug. 28, 2014.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Open Web Analytics (OWA), <http://www.openwebanalytics.com/> Printed Jul. 19, 2013 in 5 pages.
Palantir Technolgies, "Palantir Labs—Timeline," Oct. 1, 2010, retrieved from the internet https://www.youtube.com/watch?v=JCgDW5bru9M retrieved on Aug. 19, 2015.
Palmas et al., "An Edge-Bunding Layout for Interactive Parallel Coordinates" 2014 IEEE Pacific Visualization Symposium, pp. 57-64.
Perdisci et al., "Behavioral Clustering of HTTP-Based Malware and Signature Generation Using Malicious Network Traces," USENIX, Mar. 18, 2010, pp. 1-14.
Piwik—Free Web Analytics Software. <http://piwik.org/> Printed Jul. 19, 2013 in18 pages.
Pythagoras Communications Ltd., "Microsoft CRM Duplicate Detection," Sep. 13, 2011, https://www.youtube.com/watch?v=j-7Qis0D0Kc.
Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.
Quest, "Toad for ORACLE 11.6—Guide to Using Toad," Sep. 24, 2012, pp. 1-162.
Reedy, Sarah, "Policy and Charging Rules Function (PCRF)," Sep. 13, 2010, http://www.lightreading.com/document.asp?doc_id=680015 printed Dec. 10, 2013 in 4 pages.
Rouse, Margaret, "OLAP Cube," <http://searchdatamanagement.techtarget.com/definition/OLAP-cube>, Apr. 28, 2012, pp. 16.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Sigrist, et al., "PROSITE, a Protein Domain Database for Functional Characterization and Annotation," Nucleic Acids Research, 2010, vol. 38, pp. D161-D166.
Schwieger, V., "Sensitivity Analysis as a General Tool for Model Optimisation—Examples for Trajectory Estimation," 3rd IAG/12th FIG Symposium, Baden, Germany, May 22-24, 2006, Published by IAG, 2006, pp. 10.
Schwieger, V., "Variance-Based Sensitivity Analysis for Model Evaluation in Engineering Surveys," INGEO 2004 and FIG Regional Central and Eastern European Conference on Engineering Surveying, Nov. 11-13, 2004, Published by INGEO, Bratislava, Slovakia, 2004, pp. 10.
Sekine et al., "Definition, Dictionaries and Tagger for Extended Named Entity Hierarchy," May 2004, pp. 1977-1980.
StatCounter—Free Invisible Web Tracker, Hit Counter and Web Stats, <http://statcounter.com/> Printed Jul. 19, 2013 in 17 pages.
Symantec Corporation, "E-Security Begins with Sound Security Policies," Announcement Symantec, Jun. 14, 2001.
TestFlight—Beta Testing on the Fly, <http://testflightapp.com/> Printed Jul. 18, 2013 in 3 pages.
Thompson, Mick, "Getting Started with GEO," Getting Started with GEO, Jul. 26, 2011.
Traichal et al., "Forecastable Default Risk Premia and Innovations," Journal of Economics and Finance, Fall 1999, vol. 23, No. 3, pp. 214-225.
trak.io, <http://trak.io/> printed Jul. 18, 2013 in 3 pages.
Umagandhi et al., "Search Query Recommendations Using Hybrid User Profile with Query Logs," International Journal of Computer Applications, vol. 80, No. 10, Oct. 1, 2013, pp. 7-18.
UMBC CMSC 341 Introduction to Trees dated Aug. 3, 2007.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wagner et al., "Dynamic Shortest Paths Containers," Electronic Notes in Theoretical Computer Science, vol. 92, No. 1, 2003, pp. 1-19.
Wang et al., "Research on a Clustering Data De-Duplication Mechanism Based on Bloom Filter," IEEE 2010, 5 pages.
Wikipedia, "Federated Database System," Sep. 7, 2013, retrieved from the internet on Jan. 27, 2015 http://en.wikipedia.org/w/index.php?title=Federated_database_system&oldid=571954221.
Wikipedia, "Multimap," Jan. 1, 2013, https://en.wikipedia.org/w/index.php?title=Multimap&oldid=530800748.
Wollrath et al., "A Distributed Object Model for the Java System," Conference on Object-Oriented Technologies and Systems, Jun. 17-21, 1996, pp. 219-231.
Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technologies/ retrieved on Aug. 20, 2015.
Xobni, "About Page, " http://www.xobni.com/about/ printed Jun. 26, 2014 in 2 pages.
Xobni, "Blog," http://blog.xobni.com/ printed Jun. 26, 2014 in 11 pages.
Xobni, http://www.xobni.com/ printed Jun. 26, 2014 in 5 pages.
Yahoo, <http://web.archive.org/web/20020124161606/http://finance.yahoo.com/q?s=%5eIXIC&d=c . . . > printed Mar. 6, 2012 in 2 pages.
Yang et al., "An Enhanced Routing Method with Dijkstra Algorithm and AHP Analysis in GIS-based Emergency Plan," Geoinformatics, 2010 18th International Conference on, IEEE, Piscataway, New Jersey, Jun. 18, 2010, 6 pages.
Yang et al., "HTML Page Analysis Based on Visual Cues", A129, pp. 859-864, 2001.
Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
Beverley, Bill, "Windows Tips & Tricks," <http://alamopc.org/pcalamode/columns/beverley/bb0301.shtml>, Mar. 2001 in 5 pages.
Azad, Khalid, "A Visual Guide to Version Control," <http://betterexplained.com/articles/a-visual-guide-to-version-control/>, Sep. 27, 2007 in 11 pages.

(56) References Cited

OTHER PUBLICATIONS

Boyce, Jim, "Microsoft Outlook 2010 Inside Out," Aug. 1, 2010, retrieved from the internet https://capdtron.files.wordpress.com/2013/01/outlook-2010-inside_out.pdf.

Microsoft, "Introduction to Versioning," <http://office.microsoft.com/en-us/sharepointtechnolgy/HA010021576.aspx?mode=print>, 2007 in 3 pages.

Microsoft, "How Word Creates and Recovers the AutoRecover files," <http://support.microsoft.com/kb/107686>, Article ID: 107686, printed Feb. 11, 2010 in 3 pages.

Microsoft, "Managing Versions and Checking Documents in and Out (Windows SharePoint Services 2.0)," <http://technet.microsoft.com/en-us/library/cc287876.aspx>, Aug. 22, 2005 in 2 pages.

"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.

Official Communication for European Patent Application No. 09813693.0 dated Apr. 8, 2014.

International Search Report and Written Opinion for Patent Application No. PCT/US2009/056700 dated Apr. 19, 2010.

U.S. Appl. No. 14/618,213, filed Feb. 10, 2015, Final Office Action, dated Oct. 24, 2017.

U.S. Appl. No. 15/144,602, filed May 2, 2016, Notice of Allowance, dated Sep. 7, 2017.

\* cited by examiner

SYSTEM AND METHOD FOR PARAMETERIZING DOCUMENTS FOR AUTOMATIC WORKFLOW GENERATION

BENEFIT CLAIM

This application claims the benefit under 35 U.S.C. 120 as a Continuation of application Ser. No. 14/265,637, filed Apr. 30, 2014, which is a Continuation of application Ser. No. 13/218,238, filed Aug. 25, 2011, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present disclosure relates generally to data access and analysis and, more specifically, to a system and method for parameterizing documents for automatic workflow generation.

BACKGROUND

Financial data can typically be analyzed by users via applications that allow users to create analysis workflows. A workflow usually includes several components, each component generally specifying many parameters. In addition, a particular component can reference another component or a parameter within another component. For example, a first component of a workflow may include a subset of stocks to be analyzed, and a second component may apply a function to the subsets of stocks specified in the first component to generate a parameter within the second component.

After creating a particular workflow, the user often wants to modify one or more parameters of the components included in the workflow and, thereby, generate a new workflow. In existing applications, the user has to re-create the components with the modified parameters and then regenerate the new workflow. Such a solution is not only cumbersome, but is also very time-consuming as re-creating the components often takes a significant amount of time. In addition, such a solution is error prone as the user has to manually re-create the components. Lastly, because several copies of similar workflows are created, such as a solution is also not storage space efficient.

As the foregoing illustrates, what is needed in the art is a mechanism for generating new workflows from a current workflow.

SUMMARY OF THE INVENTION

One embodiment of the present invention sets forth a method for generating a new workflow for an application. The method includes generating a parameter tree related to a current workflow, wherein the parameter tree includes a different node corresponding to each parameter included in one or more documents associated with the current workflow, modifying a value associated with a first node included in the parameter tree based on an input, wherein the first node corresponds to a first parameter included in a first document associated with the current workflow, evaluating a second document associated with the current workflow based on the modified value associated with the first node, and generating the new workflow based on the evaluated second document.

A variable can be created that can be bound to different locations in the tree, where each location corresponds to a parameter in the document. Changing the value of the variable changes all the bound locations, propagating the values to the parameter in the respective document and redoes any synchronization needed for the workflow.

Advantageously, modifying a parameter in such a manner and propagating the modification across an entire workflow allows users to quickly generate new workflows from a current workflow without much manual editing. Such functionality enables users to analyze and evaluate different permutations of a particular workflow very efficiently.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Figure 1:
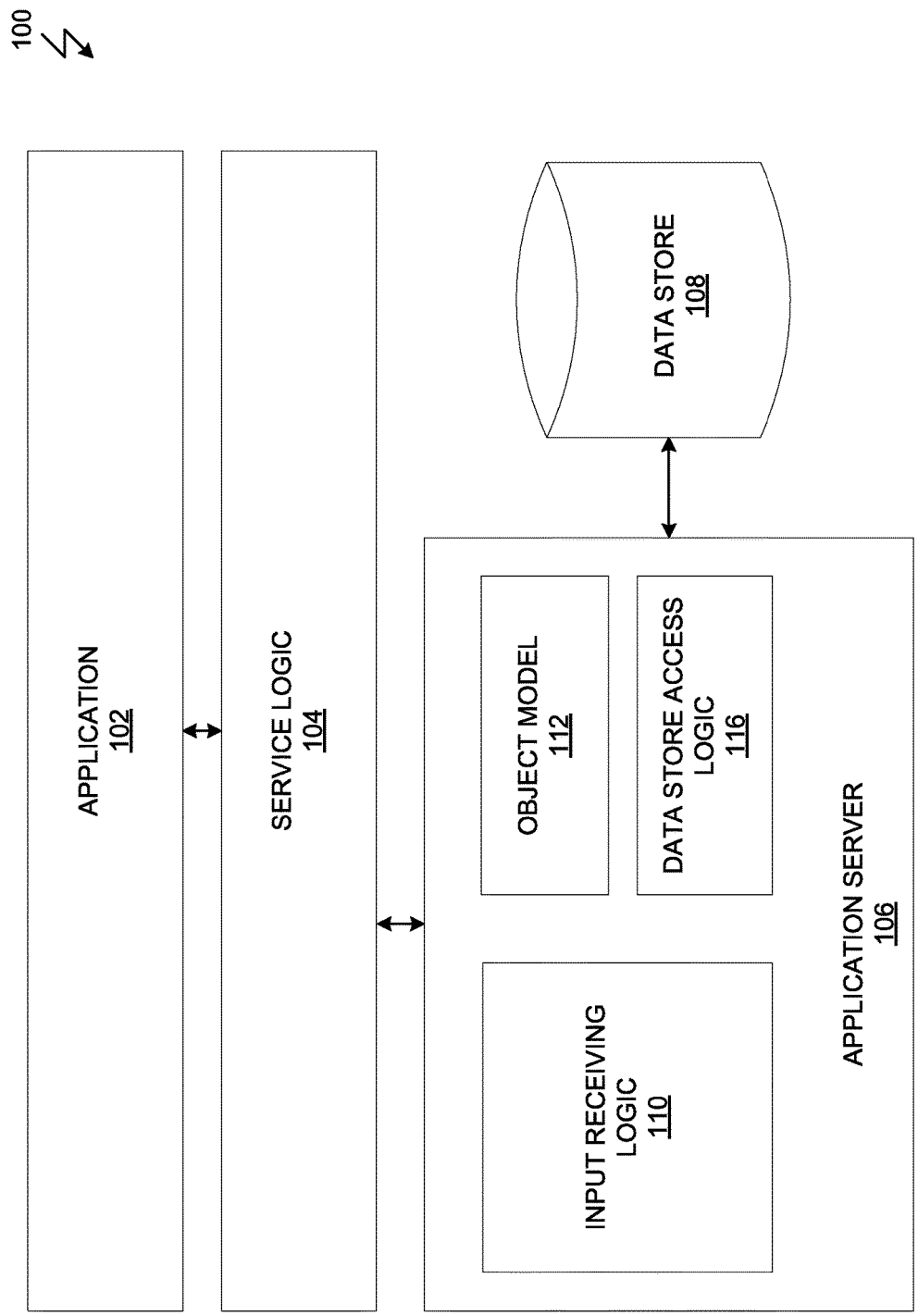
FIG. 1 illustrates a system for implementing one embodiment of the invention.

FIG. 1 illustrates a system 100 that enables a spreadsheet application to reference rich objects, according to one embodiment of the invention. As shown, the system 100 includes a application 102, service logic 104, an application server 106 and a data store 108.

The application 102 is a software program that allows a user to create, analyze and interact with workflows having one or more documents. A document is typically composed of several data objects, each having a particular type and function. The data objects that could make up a document are described in greater detail below. In addition, specific functionality of the application 102 with respect to creating workflows and automatically generating new workflows is also described below in conjunction with FIG. 2.

The service logic 104 is an infrastructure layer that, among other things, allows the application 102 to communicate with the application server 106. In one embodiment, the service logic 104 includes a messaging service (not shown) that allows the application 102 and the application server 106 to communicate asynchronously via messages.

The application server 106 includes logical elements such as input receiving logic 110, an object model 112 and data store access logic 116. The application server 106 may be implemented as a special-purpose computer system having the logical elements shown in FIG. 1. In one embodiment, the logical elements comprise program instructions stored on one or more machine-readable storage media. Alternatively, the logical elements may be implemented in hardware, firmware, or a combination thereof.

The input receiving logic 110 receives inputs from different applications executing within the system 100, such as the application 102, via the service logic 104. Inputs include, but are not limited to, processing requests, data access/storage requests and expression evaluation requests. The input receiving logic 110 transmits requests received from the different applications to logical elements within the application server 106 that are configured to process those requests.

The object model 112 is a model that specifies a universe of data objects, relationships between the data objects, higher-order data objects generated based on one or more zero-order data objects in the universe, higher-order data objects generated based on other higher-order data objects, and auxiliary entities related to the universe of data objects. The data objects may be created by users via data object creation mechanisms exposed in different applications, such as the application 102. In one embodiment, the object model 112 includes only references to the data objects and data related to those data objects is stored within the data store 108. Below are some examples of different data objects that are included in the object model 112. Persons skilled in the art would understand that any other data objects can be included in the object model 112.

Examples of Zero-Order Data Objects

Instruments: An instrument is a data object that represents any market traded entity or product of interest, such as a stock (equity), bond, currency, or fund.

Metrics: A metric is a transformation (or function) that receives one type of data (e.g., an object such as an instrument) and returns another type (e.g., another object such as a time series). A metric may perform any form of specified processing, specified computation, related operations such as database queries, network communications and data storing. For example, a metric may receive a particular instrument as input and return a time series of the particular instrument's volume. A metric may also receive one time series for an instrument and return the value of the instrument on a given day. A metric may optionally receive parameters at runtime that influence the execution of logic implemented in the metric. An example of a parameter that can be inputted into a metric to influence the execution of a metric may be a number of days to show a moving average price for MSFT where the metric calculates the moving average price.

Objects that are of a higher order than a zero order can be built using metrics. The input objects and the output objects can be zero-order or higher-order in any combination. The data changes over time. Therefore, if a metric is evaluated at two different times, it may produce different outputs. Alternatively, output objects from one or more of these metrics may be pre-computed/evaluated and stored/cached beforehand. In some embodiments, parameters may be provided to a metric to specify whether a cached object of a metric should be used as input, or whether the output of a metric should be cached or stored.

Time Series: A time series is a programmatic object that represents time-dependent information in any of several forms, including a series of discrete dates or a sequence of time-related values. Where an object model contains a large amount of time-dependent information, many time series may be created in the process of evaluating objects in the object model. For example, an instrument may have a trading history that indicates its values over a period of time. From this trading history (e.g., raw trading data), one or more time series may be created to represent time-dependent information, in any desired resolution (for example, in a time scale of years, months, weeks, days, hours, minutes, seconds).

In some embodiments, a time series may comprise a set of numeric values and a separate set of time values, wherein each numeric value has a corresponding time value in the set of time values. Each such numeric value represents a value of a certain entity at each corresponding time value in the set of time values. For example, a time series may be used to represent market values of an instrument. The above-mentioned "value of a certain entity" may be a particular market value at the closing of a trading day. In this example, the time series may comprise a set of long or double values, each of which represents a market value at the closing of a corresponding day as indicated by a time value in a separate set of time values. The time series further comprises the separate set of time values representing the closings of all corresponding days, for which market values of the instruments are included in the set of long or double values.

A time series may also be used to represent values of an entity for time values that meet certain criteria. For example, a time series may be used to represent market values for an instrument when the instrument is traded to higher prices, when the instrument is traded to lower prices, when the volatility of the instrument exceeds a certain limit, when the volatility of the instrument stays below a certain limit, or a derivative of other time series. Furthermore, the values of an entity are not limited to market values of an instrument. For example, the values of an entity, as represented by a time series, may comprise analytical values of historical volatility of two instruments.

In some embodiments, a time series associated with an instrument may be accessed by an expression containing an identifier (e.g., the identifier "GOOG" to indicate the equity instrument for Google, Inc.) for another object such as an instrument and a token (e.g., a textual name such as "HVOL" representing historical volatility of an instrument) for a type of transformation. In the present example where the time series is accessed by the expression "GOOG.HVOL", the metric identified by the token (e.g., "HVOL") receives the identifier for the instrument (e.g., "GOOG") as input and transforms raw trading data of the instrument (i.e., "GOOG") into a time series as an output object. This time series, for example, may represent time-dependent information of volatility of the instrument "GOOG" in all recorded trading days.

A time series can not only represent time-dependent information for zero-order objects such as instruments, but may also represent time-dependent information for any higher-order objects in the object model.

In some embodiments, a time series may be used to represent time-dependent information that is not related to another object. For example, a set of time values from a calendar, e.g., all week days, all work days, all Mondays, or the second days of months, may be transformed by a metric into a time series. Such a time series may be viewed as an object per se as it is independent of another object such as an instrument. In some embodiments, the time series may be accessed within a global scope, by any other objects, without naming any other object such as an instrument. In some embodiments, a time series may comprise a set of time values (e.g., all Mondays) without including a separate set of numeric values representing values of an entity that may be associated with another object such as an instrument.

Example Higher-Order Data Objects

Date Set: A date set comprises a set of time values that satisfy one or more selection criteria. As used herein, the term "time value" may include date and/or time of day information at various resolutions, for example, from multiple years to sub-seconds. For example, a date set may be all trading days when the "GOOG" stock trades up. A date set may also have an explicit start time value for the set, for example, Jan. 1, 2006; thus, the date set excludes all time values that are before the explicit start time value. Similarly, a date set may also have an explicit end time value; thus, the date set excludes all time values that are after the explicit end time value.

A date set may also take an implicit start time value, where an explicit start time value is not specified. For example, a date set that comprises all days when the "GOOG" stock trades up may have an implicit start time value when the "GOOG" stock was first publicly traded. Similarly, a date set may also take an implicit end time value, where an explicit end time value is not specified. For example, a date set that comprises all days when the "ENE" stock was available for trades may have an implicit end time value when the "ENE" stock was terminated from public trading from the New York Stock Exchange.

One of several object creation mechanisms may be used to create higher-order objects such as date sets. One object creation mechanism is a metric. This metric may take a first input that specifies a time series. This time series is generally a set of date/value pairs. The date set metric also may take a second input that specifies one or more criteria. For example, the one or more criteria as specified in the second input may specify a range. The resulting date set will then contain all the dates as indicated by the time series that are within the specified range.

Another object creation mechanism to create a higher-order object such as a date set is to directly use a programming language such as JAVA. The user may supply programming language code to the system 100, which may be compiled, interpreted or otherwise executed by the system 100 to create a date set. Extension mechanisms such as Java reflection may be used to add code segments or objects to the system so that the object creation mechanisms can be dynamically extended.

Yet another object creation mechanism to create a higher-order object such as a date set is to interact with a user interface. For example, tools or widgets may be provided in or through a graphical user interface and may interact with the user for the purpose of creating a date set.

In various embodiments, these and other object creation mechanisms, or a combination thereof, may be used to create various higher-order objects.

Index: An index indicates a collective value of one or more instruments as a function of time over a set of time values. A collective value is any type of aggregate value of the one or more instruments. The collective value may be of a market value type such as a total monetary value of the one or more instruments traded at public exchanges, or of an analytical value type such as a numeric value indicating volatility of the trading price for the one or more instruments, as a function of time over the set of time values.

For the purpose of illustration only, the one or more instruments included in the index may comprise the "GOOG", "YHOO", and "MSFT" stocks. Hence, the index may be an aggregate market value of these stocks, as a function of time over all trading days since Jan. 1, 2011. A market value is an aggregation of values of all assets included in the portfolio at a corresponding time value in the set of time values. The market value may be measured (e.g., denominated) in a reference currency such as the U.S. dollar. For example, a value of an asset such as an instrument may be a trading price of that instrument at the closing of a particular trading day. A value of the reference currency may be its trading value as denominated in the reference currency. A value of a currency that is not the reference currency may also be measured in the reference currency through an exchange rate.

An index may have a start time value, for example, Jan. 1, 2011; thus, the index does not track the collective value before the start time value. Similarly, an index may also have an end time value; thus, the index does not track the collective value after the end time value. The start time value and/or the end time value may be explicit or implicit.

To create an index, any of the object creation mechanisms may be used. An object creation mechanism may take a first input that specifies one or more time series for the one or more instruments. For example, these time series as specified in the first input may represent trading prices for the "GOOG", "YHOO", and "MSFT" stocks on all trading days when the stocks are publicly traded. The object creation mechanism also may take a second input that specifies a date set. In some embodiments, the date set as specified in the second input may specify a set of days for which a collective value of the one or more instruments should be tracked. For example, the date set may comprise a set of last five trading days of each quarter since Jan. 1, 2011. The object creation mechanism may comprise logic to compute the collective value of the one or more instruments as specified in the first input over the set of time values as specified in the second input. The object creation mechanism may create and output an index in the form of a new time series. Each numeric value in the set of longs or doubles indicates the collective value of the "GOOG", "YHOO", and "MSFT" stocks at a time value (e.g., a day) in the set of last five trading days of each quarter since Jan. 1, 2011.

The user may provide a token in the form of a string to name the index so that the definition or computed value of the index can be subsequently referenced as a named object in combination with other objects. In an embodiment, any of all the entities that are involved in specifying, creating and outputting a new index may be stored or cached in a machine-readable storage medium. In addition, the definition of new index may also be stored or cached in such a medium.

Instrument Group: An instrument group comprises one or more instruments selected from a universe of instruments using a filter chain that is created from zero or more set operations and one or more filter links. For example, an instrument group may comprise all the stocks in the S&P Index ("SPX") that are in the technology sector. Another example of instrument group may be all the stocks in the financial sector of the S&P Index that have low PE ratios.

To create an instrument group, an object creation mechanism may be used. This mechanism may take a first input that specifies the zero or more set operations. For example, a set operation of "intersection" may be specified as the first input. The object creation mechanism also may take a second input that specifies the one or more filter links. For the purpose of illustration only, such a filter link may be a criterion that any selected stock must belong to the bucket of lowest 10% among an input set of instruments. In some embodiments, graphical user interface 200 of client 120 may be used to create an instrument group. A filter view 206 may be used to represents an input set of instruments to which a filter link may be applied. In this example, all stocks in the financial sector of the S&P Index are used as an input set of instruments. These stocks are represented in an percentile filter diagram. This percentile filter diagram comprises n (a positively integer such as ten) buckets, each bucket comprising substantially a same number of instruments. Each bucket represents a particular range of 10% PE ratios. Thus, if a stock is in the top 10% among all the stocks in terms of PE ratios, the stock will be included in the bucket between 90% and 100%. Similarly, if a stock is in the bottom 10% among all the stocks in terms of PE ratios, the stock will be included in the bucket between 0% and 10%.

The object creation mechanism may comprise logic to create a filter chain by evaluating each filter link in the filter chain, combining the filter chains based on the set operation specified, and generates the instrument group that comprises the one or more instruments. In the present example, where the filter link is created using an percentile filter diagram, the object creation mechanism may create and output an instrument group that comprises a set of instruments that are in the bottom 10% of PE ratios.

The user may provide a token in the form of a string to name the instrument group. For example, this instrument group may be called "low PE SPX Financials." In some embodiments, a text input box may be provided in graphical user interface to accept input of the string. Subsequently, this named instrument group may be used in combination with other objects by a reference to the token.

In an embodiment, any of all the entities that are involved in specifying, creating and outputting a new instrument group may be stored or cached in a machine-readable storage medium. In addition, the new instrument group may also be stored or cached in such a medium.

Portfolio: A portfolio indicates a market value of included assets as a function of time over a set of time values. A portfolio may comprise a start time value from which the market value of the portfolio is to be tracked. A portfolio may optionally comprise an end time value after which the market value of the portfolio is no longer tracked. The set of assets included in the portfolio at any given time value may comprise a variable number of instruments. The set of assets may optionally include a certain amount in various currencies (including currency equivalents).

To create a portfolio, an object creation mechanism may be used. This mechanism may take a first input that specifies zero or more time series for the zero or more instruments. For example, these time series as specified in the first input may represent trading prices for the "GOOD", "YHOO", and "MSFT" stocks on all trading days when the stocks are publicly traded. In some embodiments, the object creation mechanism may use weight factors to determine how much of each of these instruments is to be hold in the portfolio at each time value of a time period starting from the start time value. The object creation mechanism also takes a second input that specifies a date set. In some embodiments, the date set as specified in the second input specifies a set of time values (e.g., the preceding time period) for which a market value of the portfolio should be computed. For example, the date set may comprise a set of all trading days since Jan. 1, 2011. The object creation mechanism may further take a third input that specifies the one or more trades over the set of time values as specified in the second input. Each trade may specify an instrument, a buy-or-sell indication, a time of trading, and a quantity. The object creation mechanism may comprise logic to execute, or to simulate execution of, trades as specified in the third input and to compute the market value of the portfolio over the set of time values as specified in the second input, thereby giving rise to a new portfolio object. Any other metric may be applied to the new portfolio object to extract information. In addition, the portfolio object may be used to create another higher-order object. In the present example, the associated set of time values to which the long or double values are mapped is the set of time values specified in the second input. For example, each numeric value in the set of longs or doubles indicates a collective market value of all assets in the portfolio at a time value in the set of all trading days since Jan. 1, 2011.

The user may provide a token in the form of a string to name the portfolio so that a subsequent reference can be made to the token in an expression that involves other objects.

In an embodiment, any of all the entities that are involved in specifying, creating and outputting a new portfolio may be stored or cached in a machine-readable storage medium. In addition, the new portfolio may also be stored or cached in such a medium.

Strategy: A strategy may be used to generate a net profit in a time period. A net profit in a time period is a net gain or loss at the end of the time period. Here, the net profit may be determined by a number of trades executed within the time period and market conditions. A block of strategy code may be used to generate the trades that are to be executed in connection with the strategy. In some embodiments, the net profit and the trades may be hypothetical and generated for the purpose of studying, validating or invalidating a particular trading strategy.

The time period may be represented by a date set that comprises a starting time value corresponding to the beginning of the time period and optionally an end time value corresponding to the end of the time period.

In some embodiments, a strategy comprises an initial collection of assets at the beginning of the time period. In a particular embodiment, this initial collection of assets may comprise only a starting net asset value in a reference currency such as the U.S. dollar.

To create a strategy, an object creation mechanism may be used. This object creation mechanism may take a first input that specifies a particular date set. Comprising a start time value and optionally an end time value as previously described, the particular date set represents a time period where trades may be generated and executed. For example, the date set may be all trading days from Jan. 1, 2006 to now. Alternatively, the date set may be all trading days when the "GOOG" stock trades up.

The object creation mechanism may take a second input that specifies a statement block, which when executed generates one or more trades. Each trade may specify an instrument, a-buy-or-sell indication, a time of trading, and a quantity. The object creation mechanism may comprise logic to execute, or to simulate execution of, the statement block and the trades as generated by the statement block and to compute the market value of the strategy over the set of time values as specified in the first input, thereby creating a new strategy object. Any other metric may be applied to the new strategy object to extract information. In addition, the strategy object may be used to create another higher-order object. Furthermore, the object creation mechanism may create and output a net profit at the end of the time period. In the present example, the object creation mechanism may create and output a net profit of 72,277.21 in the reference currency of US dollar.

The user may provide a token in the form of a string to name the strategy. For example, the strategy may be named as "VLD during rising rates. Subsequently, this strategy may be used to create other higher-order objects.

In an embodiment, any of all the entities that are involved in specifying, creating and outputting a new strategy may be stored or cached in a machine-readable storage medium. In addition, the new strategy may also be stored or cached in such a medium.

Regression: A regression may be used to perform predictions, inferences and hypothesis analyses between independent time series and a dependent time series in the object model.

To create a regression, an object creation mechanism may be used. This object creation mechanism may take a first input that specifies one or more first time series representing independent variables in a regression analysis. For example, the one or more first time series may be ones that are associated with objects like "Exxon Mobil Corp", "WTI CRUDE FUTURE (1st month generic)", and "S&P 500 INDEX" in the object model. The object creation mechanism also may take a second input that specifies a second time series representing a dependent variable in the regression analysis. The object creation mechanism may comprise logic to perform the regression analysis that transforms the one or more first time series into a predicted time series and compares the predicted time series with the second time series, thereby creating a new regression object. This new regression object may be used in part by another object creation mechanism to create other higher-order objects.

The user may provide a token in the form of a string to name the regression. Subsequently, this regression may be used in combination with other objects through a reference to its token.

In an embodiment, any of all the entities that are involved in specifying, creating and outputting a new regression may be stored or cached in a machine-readable storage medium. In addition, the new regression may also be stored or cached in such a medium.

A user may define an arbitrarily complex object that is built on top of other objects. For example, liquidity and risk models may be built as a multi-level object on top of an instrument group, a portfolio, several indexes, a date set, etc. Similarly, an index may be built on top of other higher-order objects. In some embodiments, a higher-order object may be represented as a tree. The leaf nodes of the tree are zero-order objects such as instruments. The tree may additionally and/or optionally contain non-leaf nodes. The non-leaf nodes are higher-order objects. In other words, a higher-order object may be built from building blocks. These building blocks may be zero-order or higher-order objects. For example, when an index is built from an instrument group, the instrument group also may be built from a combination of other higher-order and zero-order objects.

Any of several object creation mechanisms may be selected by a user for the purpose of creating a higher-order object. Definitions for the higher-order objects may be generated by the object creation mechanism and saved in the system. A definition may be defined and evaluated at two different times. The results of evaluation of a definition may change as underlying data changes. These results may be saved in cache or in permanent storage.

In accordance with an embodiment of the present invention, an input mechanism is provided for a user to enter expressions to the application server 106 for the purpose creating, modifying, deleting, evaluating, or saving various objects and components in the object model. Here, the term "input mechanism" includes either a command line interaction mechanism or a graphic-user-interface based interaction mechanism, or a combination of the preceding two. In other embodiments, an input mechanism is not used and objects may be specified programmatically or at runtime using other mechanisms.

An expression may comprise one or more tokens separated by delimiter characters such as a period, parentheses, a comma, quotation marks, etc. Each token may refer to an economic index, an instrument, a metric, an input object, an output object, a parameter, a time series, a higher-order-object, or any higher-order object in the object model. An expression may be evaluated with a certain order. For example, in a particular embodiment, the expression may be evaluated according to a precedence ordering among operators. Additionally and/or optionally, certain optimization logic may be used to determine whether any tokens in an expression can be evaluated in parallel.

In an embodiment that uses a modeling language, a user may type an expression "(HVOL( )+IVOL( )/2" to define a new custom metric. For the purpose of illustration only, "HVOL( )" and "IVOL( )" may be two tokens for two metrics. Tokens for other constructs may also be used. The user may give a new token "avgvol( )" for this new metric. Subsequently, the token "avgvol( )" for the new metric may be displayed as a selectable item in a dialog pane. This new metric may be used together with an instrument such as "GOOD" to cause a new time series to be created and displayed. This new time series is produced by averaging values from two time series as specified by "HVOL( )" and "IVOL( )."

The application server 106 may immediately make available this new type of object (e.g., a new function "avgvol( )") to all users of the system. The users simply specify the token associated with the new type of object in subsequent expressions. The time series representing "HVOL( )" and "IVOL( )" can be displayed in a content pane, along with a new time series as specified by the new token (i.e., "avgvol( )").

In this manner, new types of objects and new types of expressions can be continuously added to the object model 112, which causes the object model 112 to evolve over the time. For example, a user may continuously define new hypotheses as new object types or as new instances of existing object types and timely test the new hypotheses in a rapidly changing market. Evaluations of some of these hypotheses may be saved or cached along with the definitions for the hypotheses. These hypotheses can also be recalled, re-studied, and reused by way of suitable tokens at a later time.

In an embodiment, application server 106 comprises data store access logic 116. Data store access logic 116 may comprise a set of program instructions which, when executed by one or more processors, are operable to access and retrieve data from data store 108. For example, data store access logic 116 may be a database client or an Open Database Connectivity (ODBC) client that supports calls to a database server that manages data store 108. Data store 108 may be any type of structured storage for storing data including, but not limited to, relational or object-oriented databases, data warehouses, directories, data files, and any other structured data storage.

Figure 2:
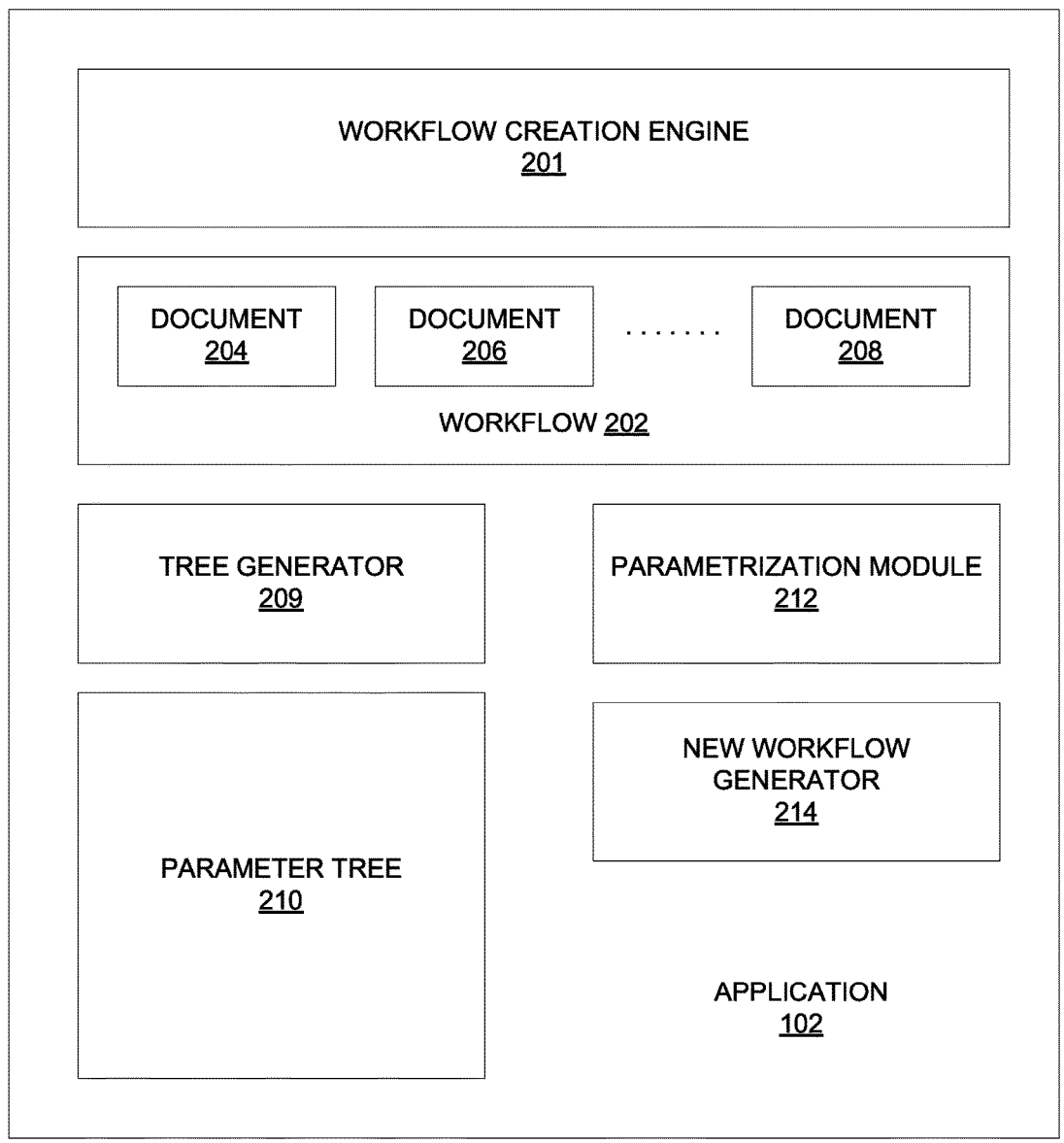
FIG. 2 illustrates a more detailed view of the application of FIG. 1, according to one embodiment of the invention.

FIG. 2 illustrates a more detailed view of the application 102 of FIG. 1, according to one embodiment of the invention. As shown, the application 102 includes a workflow creation engine 201, a workflow 202, a tree generator 209, a parameter tree 210, a parametrization module 212 and a new workflow generator 214.

The workflow creation engine 201 is a software engine that allows a user of the application 102 to create workflows, such as the workflow 202. Each workflow has one or more documents, such as documents 204, 206 and 208 in the workflow 202, where one of the documents is designated as the "top-level" document. Further, each document in the workflow 202 is composed of one or more data objects, such as the ones described above with respect to the object model 112. Data objects that are used to create a document are referred to herein as "parameters." Further a particular document, such as document 208, can reference another document, such as document 206. A pair of documents, where one document references another document, is referred to herein as "linked documents." In one embodiment, each document has a particular type, and each type of document is generated in a separate sub-engine (not shown) of the workflow creation engine 201.

The tree generator 209 is a software engine that analyzes documents within a workflow to generate a parameter tree, such as parameter tree 210 associated with the workflow 202. To generate the parameter tree, the tree generator 209 traverses through each document included in the workflow 202 to identify the parameters associated with that document. In one embodiment, each document type has a corresponding tree provider software module (not shown) that the tree generator 209 calls when identifying parameters associated with a particular document of that type. The value of each parameter of a document included in the workflow 202 is stored in the parameter tree 210.

Figure 3:
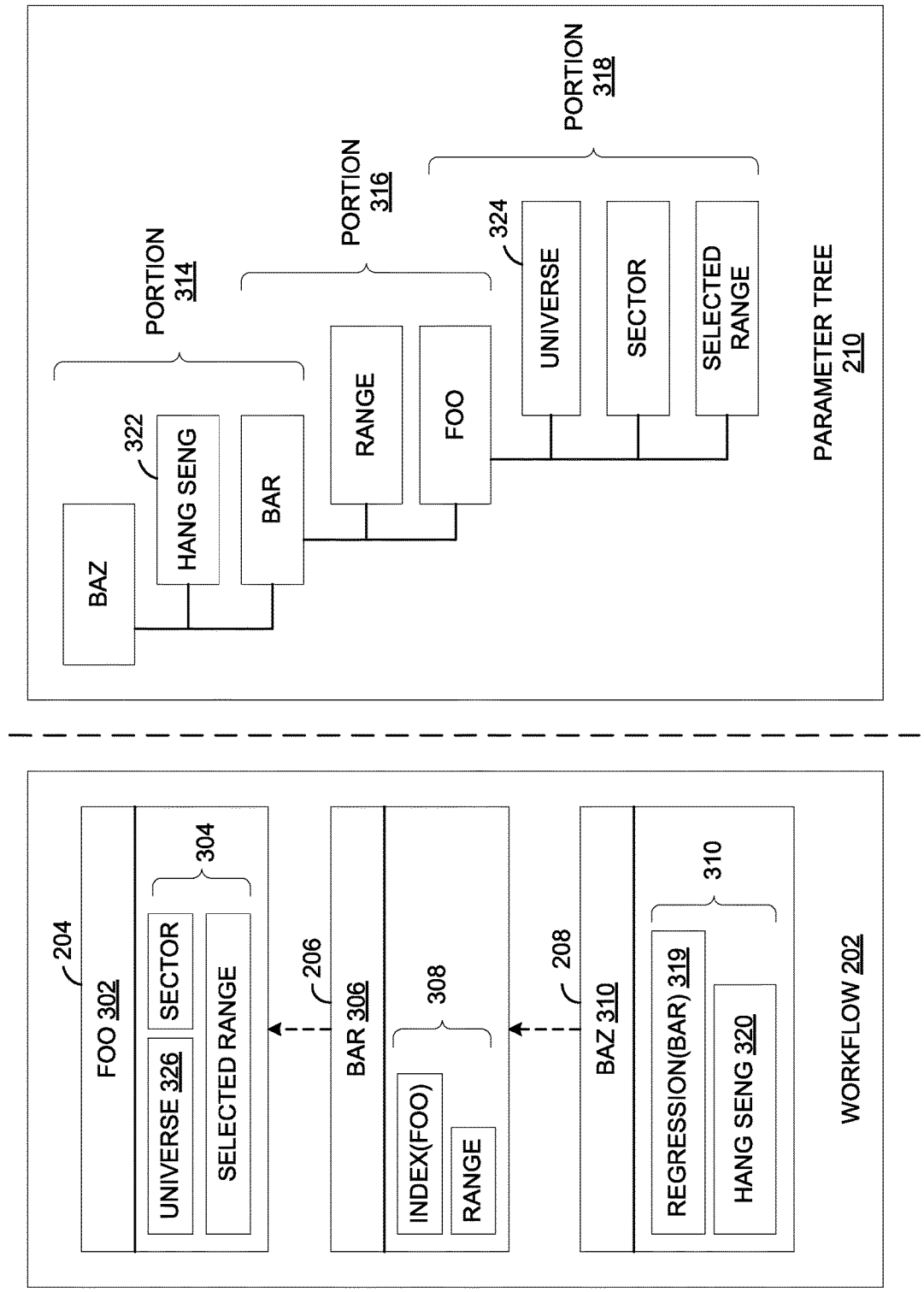
FIG. 3 is a conceptual illustration of an exemplary workflow and a parameter tree corresponding to the workflow, according to one embodiment of the invention.

An example of a parameter tree 210 generated by the tree generator 209 when analyzing a particular workflow 202 is illustrated in FIG. 3. As shown, the workflow 202 includes document 204 having an identifier "foo" 302, document 206 having an identifier "bar" 306 and document 208 having an identifier "baz" 310. As also shown, the document 204 includes parameters 304, document 206 includes parameters 308 and, similarly, the document 208 includes parameters 312. Further, document 206 references document 204 and is, therefore, linked to document 204. Similarly, document 208 references document 206 and is, therefore, linked to document 206.

In this example, to generate the parameter tree 210 associated with the workflow 202, the tree generator 209 traverses through each of the documents included in the workflow 202 to generate a corresponding portion of the parameter tree. As shown, portion 314 of the tree corresponds to document 208, portion 316 corresponds to document 206 and portion 318 corresponds to document 204. In operation, the tree generator 209 first traverses through the document 208, which, in the current example, is the top-level document of the workflow 202. The tree generator 209 identifies each parameter of the parameters 312 included in the document 208 and creates a node for each of the parameters in the parameter tree 210. For example, as shown, the node 322 in the parameter tree 210 corresponds to the parameter 320 in the document 208. When the tree generator 209 determines that an identified parameter, such as the parameter 319, is a reference to another document, the tree generator 209 traverses through the referenced document to generate the corresponding portion of the tree. In addition, each node in the parameter tree 210 is associated with a back-end data object that holds the value of that particular node. The value of the node may be modified via the back-end data object.

Referring back to FIG. 2 now, the parametrization module 212 is a software engine that allows a user to modify a value of a particular node in the parameter tree 210, where the new value is stored in the back-end data object. In response to a modified value, the parametrization module 212 propagates the value to the document that includes the parameter corresponding to the node. For example, via a user input, the user may modify the value of the node 322 within the parameter tree 210. In response, the parametrization module 212 propagates the new value of the node 322 to the parameter 320 included in the document 208. As another example, via a user input, the user may modify the value of the node 324 within the parameter tree 210. In response the parametrization module 212 propagates the new value of the node 324 to the parameter 326 included in the document 204.

In one embodiment, more than one document specifies a parameter related to the parameter corresponding to the modified node. In such an embodiment, the parametrization module 212 propagates the value of the modified node to the related parameters in different documents. In another embodiment, a single variable can be bound to different parameters included in multiple documents. In such an embodiment, a modification of the single variable results in each of the different parameters that are bound to the single variable being modified.

In a scenario where a parameter included in a lower level document that is linked to a higher level document is modified, the new workflow generator 214 re-evaluates all higher level documents linked to the lower level document and generates a new workflow. In one embodiment, the new workflow includes a version of each document in the original workflow, optionally modified based on the modified parameter. In another embodiment, the new workflow only includes the highest level document in the original workflow, optionally modified based on the modified parameter. In such an embodiment, the modifications made to any lower level documents are persisted such that the new workflow can be recreated from the original workflow whenever needed.

Continuing the example above, when the new value of the node 324 is propagated to the parameter 326 included in the document 204, the new workflow generator 214 re-evaluates the document 204 and the document 206 linked to the re-evaluated document 204. Since the document 206 is linked to the document 208, the new workflow generator 214 then re-evaluates the document 208, thereby creating a new workflow.

Figure 4:
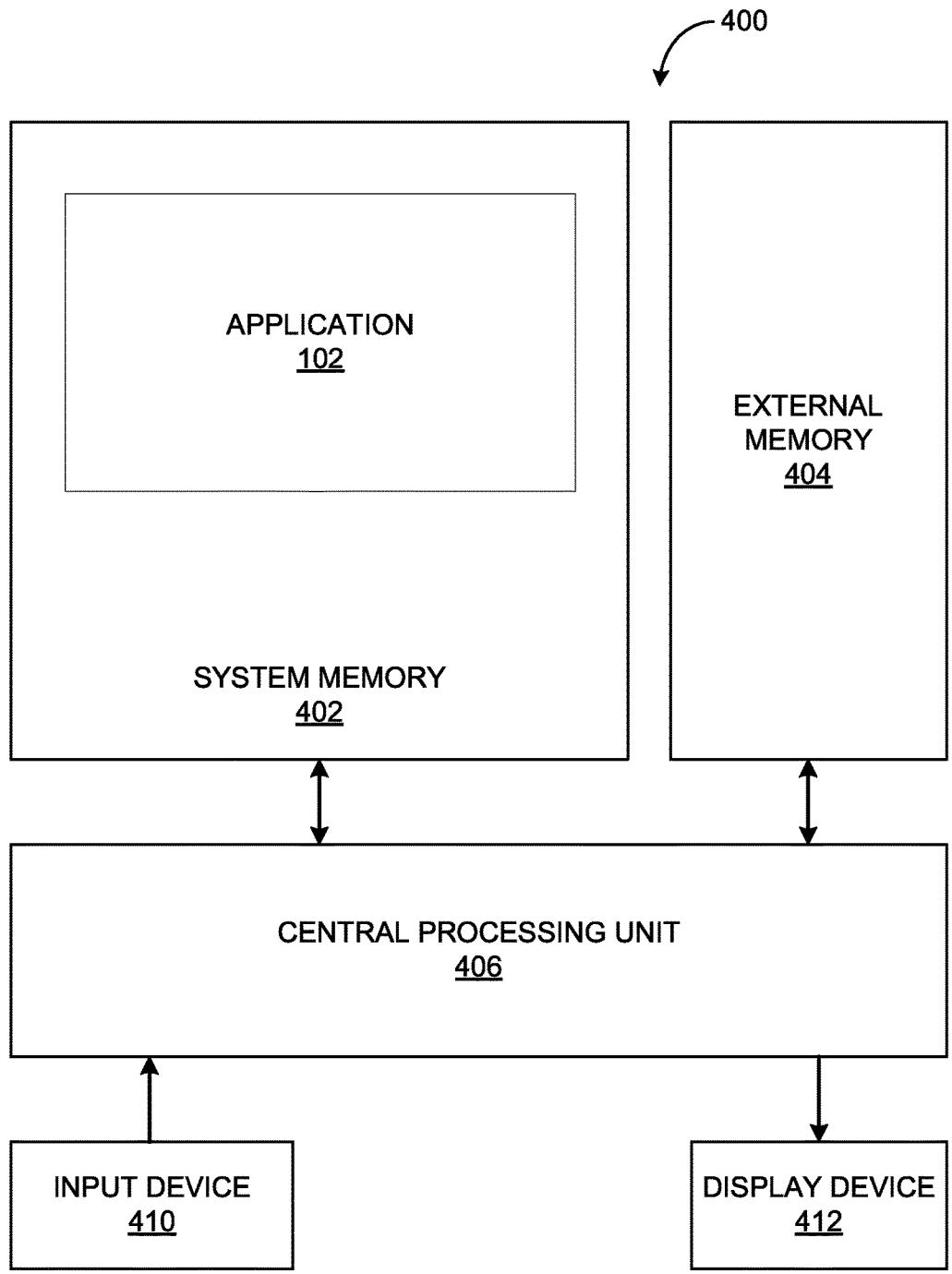
FIG. 4 is an exemplary system within which the application of FIG. 1 could execute, according to one embodiment of the invention.

FIG. 4 is an exemplary system within which the application 102 of FIG. 1 could execute, according to one embodiment of the invention. As shown, the system 400 includes a system memory 402, an external memory 404, a central processing unit (CPU) 406, an input device 410 and an display device 412.

The system memory 402 includes the application 102 previously described herein. The system memory 402 is a memory space, usually a random access memory (RAM), that temporarily stores software programs running within the system 400 at any given time. The CPU 406 executes a sequence of stored instructions associated with and/or transmitted from the various elements in the computer system 400. The external memory 404 is a storage device, e.g. a hard disk, for storing data associated with the video conferencing application 112. The input device 410 is an end-user controlled input device, e.g. a mouse or keyboard, that allows a user to manipulate various aspects of the application 102 including the UI logic 202. The display device 412 may be a cathode-ray tube (CRT), a liquid crystal display (LCD) or any other type of display device.

Figure 5A:
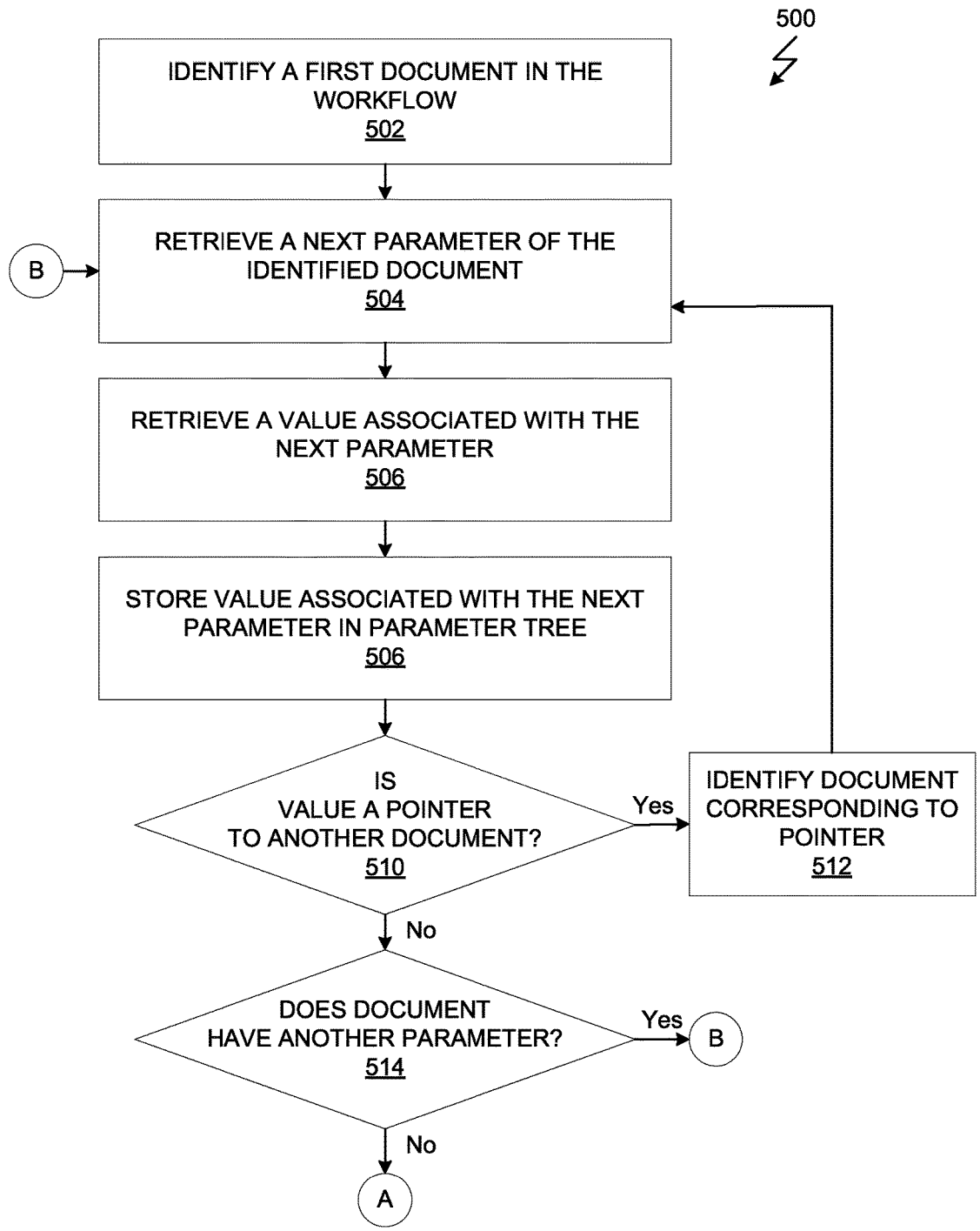
FIGS. 5A and 5B set forth a flow diagram of method steps for generating a parameter tree based on one or more documents included in a workflow, according to one embodiment of the invention.
Figure 5B:
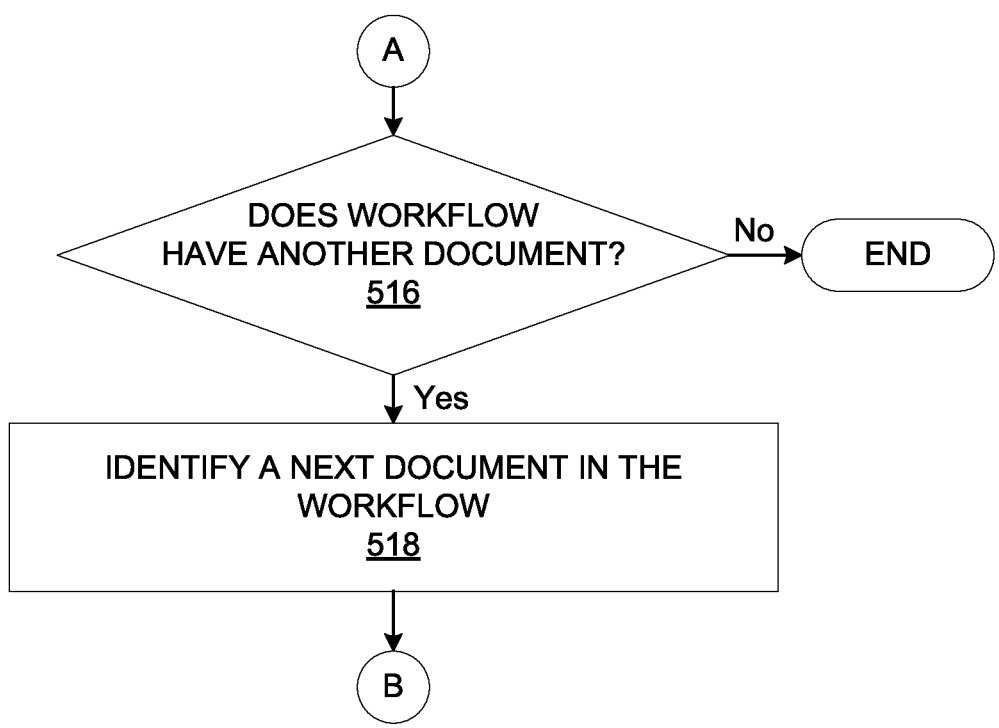

FIGS. 5A and 5B set forth a flow diagram of method steps for generating a parameter tree based on one or more documents included in a workflow, according to one embodiment of the invention. Although the method steps are described in conjunction with the system for FIG. 1-4, persons skilled in the art will understand that any system configured to perform the method steps, in any order, is within the scope of the invention.

The method 500 begins at step 502, where the tree generator 209 identifies a first document, such as the document 208 in a workflow, such as the workflow 202. At step 504, the tree generator 209 retrieves a next parameter (in the case of the first iteration, the next parameter would be the first parameter, such as the parameter 320) included in the identified document. At step 506, the tree generator 209 retrieves a value associated with the parameter, such as the value "Hang Seng associated with parameter 320, from the document that includes the parameter. At step 508, the tree generator 209 stores the retrieved value in a node, such as node 322, corresponding to the parameter in the parameter tree associated with the workflow.

At step 510, the tree generator 209 determines whether the value associated with the parameter is a pointer to another document in the workflow. If, at step 510, the value associated with the parameter is not a pointer to another document (which is true for parameter 320), the method proceeds to step 514, where the tree generator 209 determines whether the document includes another parameter. If the document includes another parameter, then the method 500 proceeds to step 504, previously described herein.

If the document does not include another parameter, the method 500 proceeds to step 516, where the tree generator determines whether the workflow has another document. If the workflow does have another document, then the method 500 proceeds to step 518, where the tree generator 209 identifies a next document in the workflow. The method 500 then proceeds back to step 504, previously described herein, where a next parameter in the document identified at step 518 is retrieved. However, if the workflow does not have another document, then the method 500 ends.

Referring back to step 510 now, if the value associated with the parameter is a pointer to another document (which is true for parameter 319), then the method 500 proceeds to step 512, where the tree generator 209 identifies the document corresponding to the pointer. The method 500 then returns to the step 504 previously described herein, where a next parameter in the document identified at step 512 is retrieved.

Figure 6:
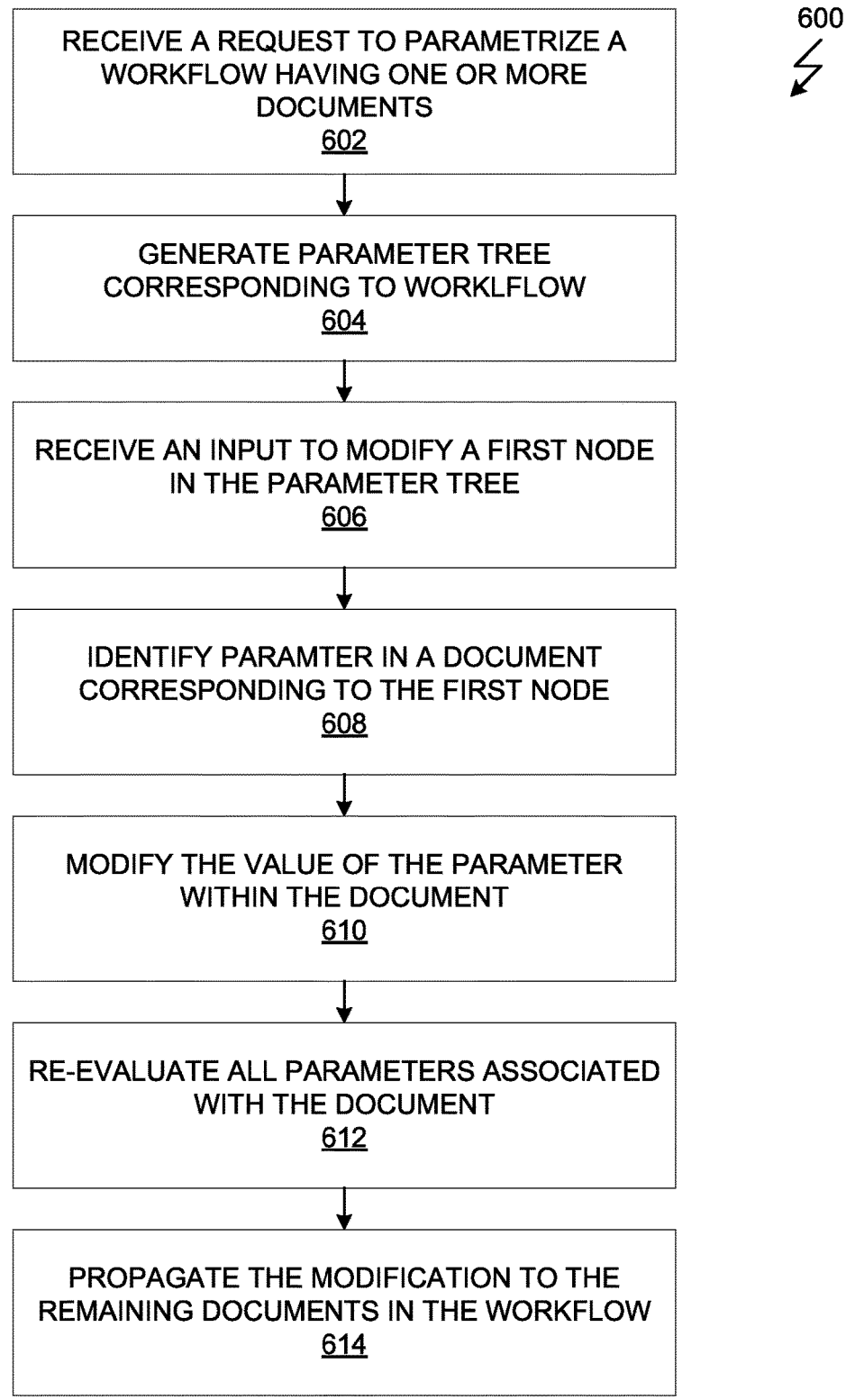
FIG. 6 is a flow diagram of method steps for automatically generating a new workflow based on the modification of a parameter associated with a current workflow.

FIG. 6 is a flow diagram of method steps for automatically generating a new workflow based on the modification of a parameter associated with a current workflow. Although the method steps are described in conjunction with the system for FIG. 1-4, persons skilled in the art will understand that any system configured to perform the method steps, in any order, is within the scope of the invention.

The method 600 begins at step 602, where the application 102 receives a request from a user to parametrize a current workflow that was generated within the application 102. The current workflow has one or more documents, each document including at least one parameter. In response, at step 604, the tree generator 209 generates a parameter tree associated with the current workflow via the method steps described in FIG. 5.

At step 606, the parametrization module 212 receives an input from a user to modify a variable linked to a first node in the parameter tree, where the first node corresponds to a particular parameter in a document included in the current workflow. At step 608, the parametrization module 212 identifies the particular parameter in the document that corresponds to the first node. At step 610, the parametrization module 212 modifies the value of the parameter based on the value received via the input at step 606.

At step 612, the new workflow generator 214 re-evaluates each parameter in the document based on the modified value. At step 614, the new workflow generator 214 propagates the modification to any remaining documents that are linked of the document via the modified parameter to generate a new workflow. In addition, the new workflow generator propagates the modification to any parameters in the various documents included in the workflow that the match the parameter that was modified.

In addition, the variable modified by the user at step 606 may be linked to multiple parameters across different documents included in the current workflow. In such a scenario, the variable modification causes the modification of each of the linked parameters and the corresponding re-evaluation of all the documents that include a linked parameter.

Advantageously, modifying a parameter in such a manner and propagating the modification across an entire workflow allows users to quickly generate new workflows from a current workflow without much manual editing. Such functionality enables users to analyze and evaluate different permutations of a particular workflow very efficiently.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:
1. A method for generating a new workflow for an application, the method comprising:
generating a first portion of a parameter tree related to a current workflow based on a first document, wherein the first portion of the parameter tree includes a first node that corresponds to a first parameter in the first document;

generating a second portion of the parameter tree based on a second document, wherein the second portion of the parameter tree includes a second node that corresponds with a second parameter in the second document, wherein the first node is associated in the parameter tree with the second node, and wherein the first document and the second document each comprise one or more functions;

modifying a first value associated with the first node, and in response to determining the second node is associated with the first node in the parameter tree, generating a new workflow that includes an altered first document and an altered second document based on the one or more functions of the second document and the modified first value;

wherein the method is performed using one or more computers.

2. The method of claim 1 comprising modifying a second value associated with the first parameter to equal the first value associated with the first node.

3. The method of claim 2, wherein evaluating the second document comprises modifying a third value associated with the second parameter included in the second document based on the second value associated with the first parameter.

4. The method of claim 3, wherein the second document comprises a top-level document associated with the current workflow, and the new workflow includes only one document corresponding to the second document.

5. The method of claim 2, further comprising storing the second value associated with the first parameter included in the first document, and then regenerating the second document based on the second value associated with the first parameter.

6. The method of claim 1, wherein generating the parameter tree comprises traversing the first document to extract each parameter included in the first document.

7. The method of claim 6, further comprising, for each extracted parameter, setting a value associated with a node included in the parameter tree and corresponding to the extracted parameter based on a value of the parameter.

8. The method of claim 1, wherein a third parameter included in a third document associated with the current workflow matches the first parameter, and further comprising modifying a value associated with a third node in the parameter tree that corresponds to the third parameter.

9. The method of claim 8, wherein the first node and the third node are bound to a first variable, and the method comprising determining that the first variable is modified; in response, modifying the value associated with the first node and the value associated with the third node accordingly.

10. A computer system comprising:
a processor;
a memory;
a tree generator configured to generate a first portion of a parameter tree related to a current workflow, wherein the first portion of the parameter tree includes a first node that corresponds to a first parameter in the first document, and to generate a second portion of the parameter tree based on a second document, wherein the second portion of the parameter tree includes a second node that corresponds with a second parameter in the second document, wherein the first node is associated in the parameter tree with the second node, and wherein the first document and the second document each comprise one or more functions;

a parameterization module and a workflow generator, wherein the parameterization module is configured to modify a first value associated with the first node, and in response, determine the second node is associated with the first node in the parameter tree and cause the workflow generator to generate a new workflow that includes an altered first document and an altered second document based on the one or more functions the second document and the modified first value.

11. The computer system of claim 10, wherein the parameterization module is configured to modify a second value associated with the first parameter to equal the first value associated with the first node.

12. The computer system of claim 11, wherein the parameterization module is configured to evaluate the second document comprises by modifying a third value associated with the second parameter included in the second document based on the second value associated with the first parameter.

13. The computer system of claim 12, wherein the second document comprises a top-level document associated with the current workflow, and the workflow generator is configured to generate the new workflow to include only one document corresponding to the second document.

14. The computer system of claim 11 wherein the parameterization module is configured to modify a third value associated with the second parameter included in the second document based on the second value associated with the first parameter.

15. The computer system of claim 10, wherein the tree generator is configured to traverse the first document; extract each parameter included in the first document to generate the parameter tree.

16. The computer system of claim 15, wherein the tree generator is configured to, for each extracted parameter, set a value associated with a node included in the parameter tree and corresponding to the extracted parameter based on a value of the parameter.

17. The computer system of claim 10, wherein a third parameter included in a third document associated with the current workflow matches the first parameter, and the parameterization module is configured to modify a value associated with a third node in the parameter tree that corresponds to the third parameter.

18. The computer system of claim 17, wherein the first node and the third node are bound to a first variable and the parameterization module is configured to determine that the first variable is modified; in response, modify the value associated with the first node and the value associated with the third node accordingly.

* * * * *